United States Patent
Wang et al.

(10) Patent No.: US 8,504,718 B2
(45) Date of Patent: Aug. 6, 2013

(54) SYSTEM AND METHOD FOR A CONTEXT LAYER SWITCH

(75) Inventors: Guo Qiang Wang, Santa Clara, CA (US); Wen Tong, Ottawa, CA (US)

(73) Assignee: Futurewei Technologies, Inc., Plano, TX (US)

( * ) Notice: Subject to any disclaimer, the term of this patent is extended or adjusted under 35 U.S.C. 154(b) by 487 days.

(21) Appl. No.: 12/769,052

(22) Filed: Apr. 28, 2010

(65) Prior Publication Data
US 2011/0271007 A1 Nov. 3, 2011

(51) Int. Cl.
*G06F 15/173* (2006.01)

(52) U.S. Cl.
USPC .......................... 709/238; 709/240

(58) Field of Classification Search
None
See application file for complete search history.

(56) References Cited

U.S. PATENT DOCUMENTS

| | | | |
|---|---|---|---|
| 7,096,210 B1* | 8/2006 | Kramer et al. | 706/45 |
| 7,469,310 B2* | 12/2008 | Kadambi et al. | 710/303 |
| 7,509,673 B2* | 3/2009 | Swander et al. | 726/11 |
| 7,948,986 B1* | 5/2011 | Ghosh et al. | 370/392 |
| 7,961,739 B2* | 6/2011 | Perry et al. | 370/397 |
| 2008/0192740 A1* | 8/2008 | Lorusso et al. | 370/389 |

OTHER PUBLICATIONS

Koponen, T., et al., "A Data-Oriented (and Beyond) Network Architecture," SIGCOMM '07, Aug. 27-31, 2007, 12 pages, Kyoto, Japan.
"Why do we need a Content-Centric Future Internet? Proposals towards Content-Centric Internet Architectures," Created by the Future Content Networks Goup, May 2009, 23 pages, Prague.
Dobrescu, M., et al., "RouteBricks: Exploiting Parallelism to Scale Software Routers," Proceedings of the $22^{nd}$ ACM Symposium on Operating Systems Principles, Oct. 11-14, 2009, 14 pages, Big Sky, MT.
Jacobson, V., "Introduction to Content Centric Networking," FISS 09, Jun. 22, 2009, 96 pages, Bremen, Germany.

* cited by examiner

*Primary Examiner* — John B. Walsh
(74) *Attorney, Agent, or Firm* — Slater & Matsil, L.L.P.

(57) ABSTRACT

In accordance with an embodiment, a network device has an input port for receiving input packets, and an output port for sending output packets, where the input packets and output packets have context layer information. The network device also includes a processor configured to process the input packets and output packets using a network protocol having a context layer.

25 Claims, 21 Drawing Sheets

SYSTEM AND METHOD FOR A CONTEXT LAYER SWITCH

TECHNICAL FIELD

The present invention relates generally to data communication systems, and more particularly to a system and method for a context layer switch.

BACKGROUND

After an over forty-year journey from its infancy to a widely accepted business/application model, the TCP/IP based Internet has become a universal communication platform. Internet technologies have successfully transformed legacy end-to-end communication systems from a circuit-to-circuit model (i.e., circuit switching) to a host-to-host model (i.e., packet switching). Recently, however, the industry is gaining momentum to transfer next generation Internet technology from connectivity-based networking to content-based networking. Content-centric networking is designed and optimized for the content itself, and aims to be highly distributed and collaborative to fill the growing demand for networks that support personalization and social media.

Internet protocol (IP) routing is designed for host-to-host conversation, but today most Internet traffic is used for content dissemination. As the demand for content, such as streaming video, increases, using traditional IP routing becomes more challenging. For example, a small percentage of content may account for a large percentage of total network traffic. Current Internet IP routing designs, however, have not been optimized for this skew distribution resulting in over-subscription between Digital Subscriber Line Access Multiplexer (DSLAM) and Ethernet switchers, between Ethernet switchers and Broadband Remote Access Servers (BRAS), and between BRAS to edge routers. Over-subscription occurs, for example, when IP routing only provides a "pipe" transmission without regard to the characteristics of the content being carried. Therefore, IP routing has difficulty optimizing content traffic dissemination over underlying link layer network resources such as bandwidth and topology.

What are needed are efficient systems and methods of content distribution having high availability, high reliability, low latency, and ubiquitous mobility.

SUMMARY OF THE INVENTION

In accordance with an embodiment, a network device has an input port for receiving input packets, and an output port for sending output packets, where the input packets and output packets have context layer information. The network device also includes a processor configured to process the input packets and output packets using a network protocol having a context layer.

In accordance with another embodiment, a method of operating a network device includes transmitting and receiving packets on at least one port and receiving a first packet from a client on at least one port, where the packets have context layer information and the first packet includes a content name and a context label header. The method also includes determining if requested content associated with the content name is in a local memory. If the requested content is not in the local memory, at least one second packet is transmitted to a second network device on the at least one port, where the at least one second packet includes the content name. In some embodiments, the at least one second packet also includes a context label header. If the requested content is in the local memory, at least one third packet is transmitted to the client on the at least one port, where the at least one third packet includes the requested content.

In accordance with another embodiment, a method of operating a context level switch includes receiving a first packet from a client on at least one port, where the packet includes a content name and a context label header. The method also includes retrieving the requested content from memory and transmitting at least one second packet to the client on the at least one port, where the at least one second packet includes the requested content.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
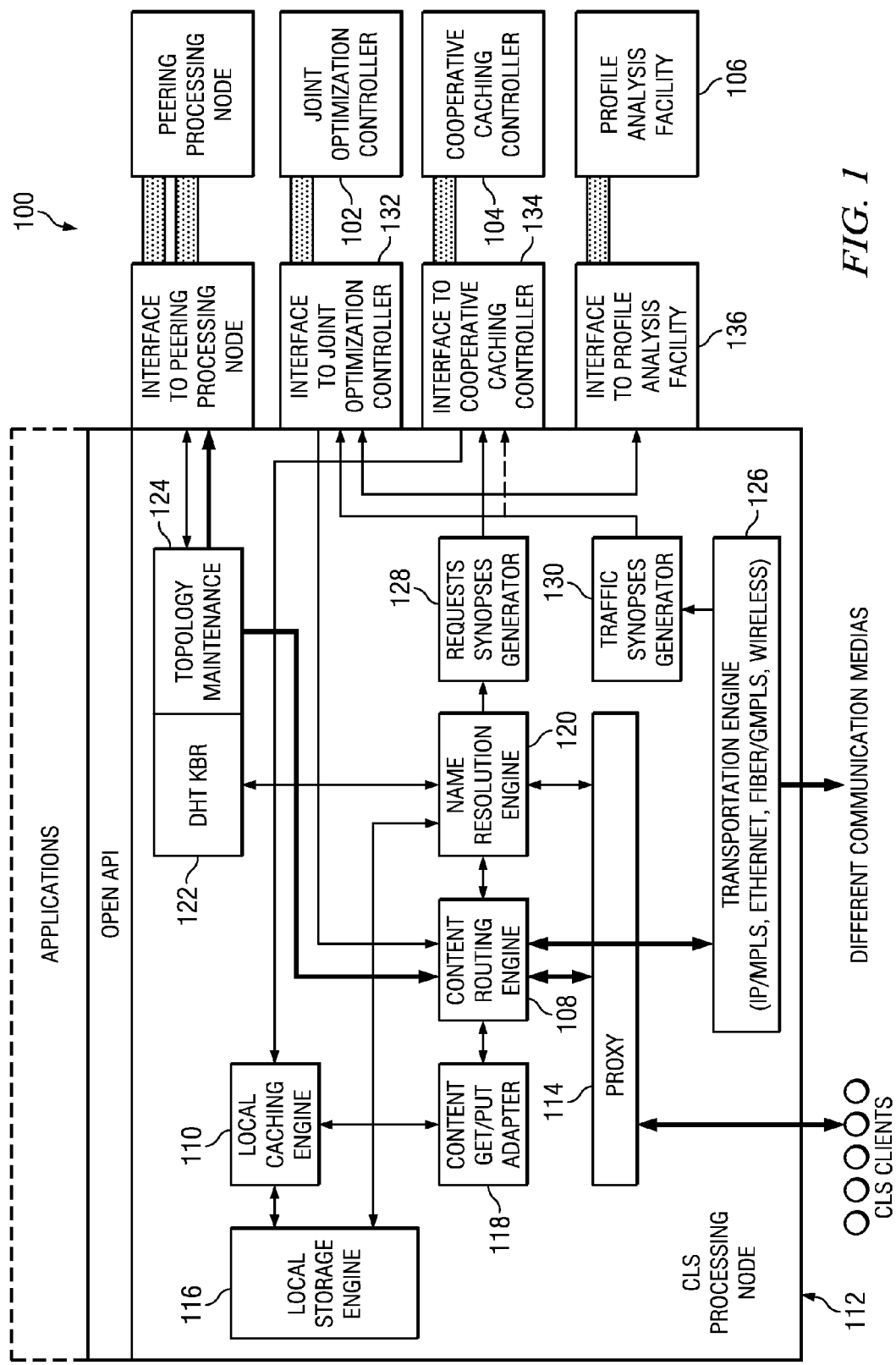
FIG. 1 illustrates a functional block diagram of an embodiment Context Label Switch (CLS) node.

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in specific contexts, for example, a context layer switch. Embodiment devices include, but are not limited to context layer switches, routers, network devices, client devices, cellular telephones, and Internet access devices, as examples.

Embodiments of the present invention include applications of Context Label Switching (CLS) technology for next generation Internet that moves content among people and machines. A Context Label (CL) as a relationship profile which interrelate the communication-enabled attributes of a network, user and interested content/application. In embodiments, CL is used to label application information chunks (I-chunk) and to guide the data delivery services, and is used to describe the delivery service semantics of Internet (i.e., who, what, when & where). Based on a given CL, embodiment CLS-enabled network devices could switch and deliver application data among peers. Embodiments work within a Context Label Layer (CLL) framework architecture and operate using content-oriented network communication techniques. In CLL, the CL is created, added, removed and switched between content publisher and consumer or from machine to machine.

The Internet has become a common platform that allows people to share information and content. Content sharing over hyper-connected Internet with user/device mobility has moved Internet communication model from a traditional fixed point-to-point conversation (e.g., phone) to p-mp or mp-mp ubiquitous information dissemination (e.g., video conference). The current technology development is toward the convergence of services over diverse delivery platforms for both wire-line and wireless communication networks. Networks, user devices and service/applications will adapt to the user's personal preference and context.

For the end users, Internet application/service operational semantics can be represented, in some embodiments, as a "Who gets or provides What at Where and When, and with Trustiness" system, in which "Who" is the user ID (e.g., consumer ID or supplier ID in subscriber/supplier model), or device ID (e.g., machine-to-machine model); "What" is the interested content/service name; "Where" is the location of user or device; "When" is the time stamp of consumer requested or the content/service to be provided, and how long the content can exist in the network; the "Trustiness" is an agreement for confidence or faith between consumer and supplier.

In principle, this Internet service operational semantic can be characterized and quantified as a relation R=(User/Device, Content/Service, Time, Location, Security). In embodiments, a Context-Oriented Profile (CCP) is defined, where CCP is a subset of R. Each element of CCP is a Context Label (CL). CL can be used in Internet service operation to inquire and deliver content and service/application data. For example, CL can be embedded in user's request such as "Tony's iPhone wants movie: xxx at location: (e.g., GPS) on: next Monday," and the movie supplier can deliver movie: xxx with an assigned security code in the response and follow the navigation guided by the given CL. Embodiments of the present invention use CLS.

In an embodiment, a CLS forwards and relays content I-chunk with build-in CL between peers. CLS has a local cache for content storage, where the working mode of CLS is to store, process, and forward, where the "process" function is to process the local content cache, based on a defined CL. In some embodiments, irrelevant content replication and unnecessary data relay operations are removed. In some embodiments, the CLS is "application-aware" and provides a "smart-pipe" for the service provider and enterprises of next generation Internet.

In some embodiments, a context is defined as a profile that consists of minimal set of attributes associated with supporting content delivery in a communication network. From the operational semantic of content/application delivery service, context interrelates altogether of communication-enabled attributes from dynamically changing network property such as, location and presence; user profile such as interesting preference, device type, user ID, and service transaction time; and application attributes, such as content name, version, security, size and TTL (Time-To-Live). Other attributes can be defined in other embodiments. The context is adapted into the service delivery platform to guide the content delivery in the network.

In embodiments, the "label to" represents a context defined for data content, for example, CL. In some embodiments, CL is different from the legacy label defined in a Multiple Protocol Label Switch (MPLS), Generalized MPLS (GMPLS), and/or Transport MPLS (TMPLS), or Provider Backbone Bridge/Provider Backbone Transport (PBB/PBT) where a label is used to identify a data transport connection/connectivity. In embodiments, CL is used to identify a relationship profile for content delivery service. This profile has of several attributes from network, device, application/service, security, etc. In some embodiments, the context label is created and attached to application I-chunks, and is used as an in-band or an out-band signaling mechanism to guide the content delivery service and storage service in the network.

In embodiments, CL is defined as an N-element-tuple (N>=1) which has attributes and elements defined from a network property, a user/device profile and/or applications and services. For example, in an embodiment, network-defined elements may include location info and presence info; a user profile may include user ID, device-ID/device-type, and preference and transaction time, etc. In embodiments, application/service-defined elements may include content name, version, medium type, content I-chunk number, chunk size, content published time, content TTL and security code, etc. Each CL is an element of a content-oriented profile that represents the relationship between user, content and network.

In an embodiment CLL, a CL can be implemented as an ASCII string (constituted by following certain rules) in content data chuck. The format of the CL is identified and processed by a FPGA, an ASIC, or a network processor based on pre-defined rules. For example, in one embodiment, CL uses a format of widely used application layer protocol such as URL or other format. In embodiments, CL normally is created by the end device based on a pre-defined policy for content publishing, inquiry and delivery. CL is attached to application I-chunks and can be modified by a CLS within the network for the purpose of delivery security (e.g., add /remove encryption) or late-banding (e.g., change location or time element).

In embodiments, CLL is defined as a protocol stack to create, add, remove, update and switch CL in the network. From the perspective of layered protocol stack, CLL is located between application/service and data transport protocol. The application/service layer may be any type of content such as video, audio, Web, Email, and voice, while the data transport layer could be TCP/IP, UDP, P2P, PPP, Broadcasting protocol, Ethernet MAC, wireless MAC, MPLS/TMPLS, PBB/PBT, or GMPLS. CLL is overlaid with any data transport layer. An embodiment data transport layer is overlaid with various physical link layers such as Ethernet, Bluetooth, WiMAX/LTE, WiFi, DSL, xPON, DOCSIS, and Optical. In alternative embodiments, other application service layers, data transport layers and/or physical layers can be used.

In embodiments, CLL can be implemented at an end user device, an access device, an access gateway and a CL-enabled router/switch. CLL is responsible to segment/assemble the application content to/from variable size content chunks, and dispatch/receive the CL data to/from the lower layer, depending on the maximum transmission unit (MTU) capacity of various physical links. Based on pre-defined profile policy, CLL creates and inserts CL for each content chuck (at the sender), or modifies CL (at an intermediate relay node), or removes CL (at the receiver) from each content chunk in some embodiments. CLL also implements CL management plane, CL routing plane, CL forwarding plane, CL service process plane and CL caching process plane. Based on CL, the CL routing plane is used to find the routing path, to guide global content search/discovery, to determine next hop/interface, and to manage mobility anchoring and location service. The CL forwarding plane is used to guide the content delivery, to manage content flow for load balancing and traffic engineering, to prioritize traffic scheduling for Quality of Service (QoS) and to control CL switching fabric. The CL service plane is used to execute content distillation, dissemination, mash up, content aggregation and content chunk customization (i.e., same video may be sent to different end devices with various resolution/contrast), and intelligent traffic management. The CL caching process plane is used to execute local data retrieval, local caching, content database maintenance, global content synchronization and aggregation, content deduplication, and content access privilege policy management. In alternative embodiments, CL management plane, CL routing plane, CL forwarding plane, CL service process plane and CL caching process plane may encompass a subset, superset, and/or different functionality as the functions described above. In further embodiments, CLL may implement a security sub-layer to handle all security issues including the encryption/decryption for content chunk and CL, as well as to manage security key distribution.

In an embodiment, each N-element CL is a variable size ASCII string which may be implemented as widely used format such as URL. CL is used mainly for facilitating content discovery and content delivery/routing. In some embodiments, CL uniquely identifies a content chunk. The composition of CL follows some policy-constraint rules such as constitution priority. For example, a CL may be created by the following embodiment method:
 1. CL=Content title; If not unique, continue;
 2. CL=CL+version; If not unique, continue;
 3. CL=CL+publisher-name; If not unique, continue; and
 4. CL=CL+published-time.

In an embodiment, CL composition follows a hierarchical structure (i.e., tree-like), where each node in the tree represents an attribute defined by network, user/device profile or by an application and/or service. The position of each node in the tree is defined by the policy of a Content Oriented Profile. CLL will use this naming tree to create a CL and use CL in the following scenarios:
 1. Publish CL content to local repository and content server;
 2. CL content distillation, dissemination, mash up, global synchronization and aggregation;
 3. CL as index for local content storage and maintenance;
 4. CL as index for Content search and inquiry;
 5. Content routing to find a path;
 6. Content forwarding;
 7. CL for mobility management and location services; and
 8. CL for security key distribution and crypto operation.

In further embodiments, CL can be used for other functions.

In some embodiments, CL represents the content delivery relationship between the subscriber and the supplier, which inter-relate attributes from network, user and application. In some embodiments CL only describes a delivery service operational semantic. When content chunks are delivered on overlay data transport network, CL can be mapped into any type of transport connection medium such as MPLS/GMPLS label, IP address, MAC address, WiMAX/LTE connection ID, etc.

In some embodiments, CL is created, added and removed by the end user node or content server, and may be updated at intermediate nodes. In some embodiments, CL is handled at access edge nodes as long as the edge device knows how to deliver the content to the right user device without using CL operation.

In some embodiments, CLL-enabled relay nodes may modify some elements of a given CL. For example, if a particular link/network needs security protection, CLL-enabled relay node may add extra security coding in CL and remove these security codes before making content chunks leave the link/network. In some another cases, CLL-enabled relay nodes may change CL location elements or TTL elements due to the next hop reachability issue or some other considerations (e.g., the presence or the mobile location of the receiver). This is referred to as a "late-binding" capability.

In an embodiment, CLS is a CLL-enabled access device, gateway, routing switch, or some other data-capable access and transport devices. From system level, CLS implements several CCL functional engines (or planes), which may include a management plane, CL routing plane, CL forwarding plane, CL service process plane, and CL local cache process plane. Local cache is a local database or data server. Physically these planes can be built into the same box/chassis, or in separate box/chassis depending on the embodiments. Each plane may have its own network processors (multi-core or single-core) and I/O interfaces, and communicate with each other via high-speed channels. Logically, these functional planes are clustered together and are represented by a CLS in some embodiments.

The management plane conducts system FCAPS functions using management interfaces such as GUI, Web, CLI, SNMP, CORBA or some other standard/proprietary management protocols in some embodiments. This plane implements NE Operation, Administration, Maintenance & Provisioning (OAM&P) functions.

The CL routing plane implements CL routing algorithms and protocols to determine the adjacent CLSs and next hop for relaying content chunks in embodiments. The next hop CLS determination may rely on interested content distribution, CL location info and overlay physical network topology. Various criteria help determine CL routing paths in some embodiments. For example, in one embodiment, a hybrid approach is used in a broadcasting-enabled LAN and point-to-point WAN autonomous domain. In LAN or PBB/PBT enabled access network, CLS may use broadcasting CL inquiries (similar to Dynamic source routing protocol) to determine the next hop, while in BGP domain or MPLS/TMPLS/GMPLS network, DHT or DNS protocols can be used to determine where the next hop is for inquired content. In GPS covered area, for example, the location information embedded in CL can be used to determine the next hop. In CLL networking topology, the next hop is defined as the adjacent CLL-enabled end devices, the CLL-enabled switch/router, or the CL-enabled local cache server. In embodiments, each CL contains enough information, for example content chunk name prefix and GPS information, for the routing plane to determine the routing path. When CLS nodes overlay existing transport infrastructure, for example, an IP network, CL routing learns underlying topology and bandwidth to conduct integrated routing to optimize network resources and promote content delivery performance in some embodiments. For example, CLL layer topology and IP layer topology can be collaborated.

In some embodiments, the CL next hop may also include the local cache (if the interested inquiry is discovered in the local cache). Similar to normal IP router, CL routing plane stores a routing table which consists of the mapping between CL prefix and the logical/physical I/O interfaces of CLS. Once a CL routing table is established, it will be installed in the CL forwarding plane, for example, for relay purposes. When CLL is implemented over an overlay network such as IP routing, PBB/PBT routing, MPLS/GMPLS routing, the CL routing plane may co-exist with these routing planes in some embodiments. The collaboration between the CL routing plane and the other routing planes is implemented in either an overlay model or integrated model. An embodiment CL routing plane may also support mobility management and location services, due to the fact that CL may have embedded location information.

The CL forwarding plane includes CLS switch fabric, I/O interfaces and network processors to handle content relay, to manage content flow for load balancing and traffic engineering, and to prioritize traffic scheduling for QoS, and delivery policy enforcement. In some embodiments, CLL security sub-layer crypto functions may be implemented in this plane. To accelerate content relay at line speed, CL look up and classification ("deeper packet inspection") process and security encryption/decryption may all be implemented, for example, in an FPGA, ASIC, or very-high speed network processor. Based on the CL routing table made from the CL routing plane, and an action list defined by the CL service plane, the forwarding plane executes CL look up to determine the egress interface, and shifts content chunks from the ingress port of switch fabric to the egress port. Based on the overlay network architecture and interfaces, CL forwarding plane handles all L2/L3/L4 protocol stacks to terminate and dispatch the received data packets in some embodiments. The CL forwarding plane may also execute relay policy enforcement. In embodiments, the policy profiles are configured from either the CL management plane or the CL service plane.

In an embodiment, the CL service plane is responsible for several tasks including content distillation, dissemination, mash up, content aggregation and content chunk customization (i.e., same video may be sent to different end devices with various resolution/contrast). This plane may also support local/global load balancing and intelligent traffic management for content distribution. Based on the policy for content flow, the service plane may install user/content service profiles and related action list into CL forwarding plane for flow processing. Optionally, this control plane may support content security functions such as authentication and key distribution. In some embodiments, the control plane communicates with a local cache server to store and update content database.

In further embodiments, other functions of the service plane may also include user account and device attachment management, user presence and mobility management, and service level agreement (SLA) profile management In an embodiment, Local cache server manages local content storage. Typical tasks of an embodiment local cache are to create, update, re-fresh (based on TTL in CL), retrieve and synchronize/aggregate the contents with other CLSs, and make/remove the duplication of contents. The CL name prefix is used as key/index to store and to discover the interested data. In some embodiments, content and its key refreshment and disposal may be restricted by TTL. This plane also manages content access privilege policy.

In one embodiment, a trust-to-trust content-oriented networking model delivers content and applications based on named data with built-in security. In one embodiment, named hosts are not used. Rather, the network handles more "application semantics" which are relevant to the environmental context of the information such as the security/privacy, the content name and type, the end user device, user location and presence, and the content life circle (e.g., time to live (TTL)) within the network. In such an embodiment content-oriented network, content security, content storage and content delivery are built-in functions of the network. In some embodiments the network leverages powerful distributed computing and optimization to minimize capital expenses and operational expenses, as well as improving user experience for content.

An embodiment CLS is a platform for a content-centric networking model. CLS delivers contents by leveraging and consolidating advanced distributed computing, joint optimization based routing/forwarding protocols, and more cross/inter-layer optimization algorithms. In an embodiment, CLS provides content/application delivery services with these enabling technologies to create a "green" and "behavior-adaptable" environment for global information sharing.

In an embodiment, a CLS system encompasses 5 building blocks: a very scalable and fast Content-based Naming and Resolution scheme with self certifying content names, a cost efficient and scalable collaborative network embedded storage cloud for caching, practical Traffic Engineering/Server Selection, a content positioning system having joint optimization (i.e., cross-layer) for content dissemination routing to leverage IP or non-IP capabilities such as content networking directly over Ethernet, and a parallel computing cloud for user-content profile analytics and content service processing.

In embodiments, CLS has protocols that support content based naming, resolution and joint optimization. However, in some embodiments, existing protocols are incorporated into systems, such as embedding opaque type length value (TLV) into routing protocols such as Intermediate Systems-Intermediate Systems/Border Gateway Protocol (IS-IS/BGP) data packets. The opaque TLV is used to carry the information of CLS node and CL.

In some embodiments, CLS-enabled delivery services incorporate embodiment network reference models, interface requirements, functional entities, protocols, and procedures for various CLS implementation alternatives.

In an embodiment CLS architecture, logical entities decompose and alternative deployment views map CLS logical entities to physical network elements (NEs)

In an embodiment, CLS nodes interwork with each other via CLS User Network Interface (UNI) and CLS Node-Node Interface (NNI) protocols, including, but are not limited to:

1) intra/inter-domain content based naming and resolution protocol;
2) user-content requests profile collection protocol;
3) collaborative cache decision/suggestion feedback protocol;
4) user-content profile analytics feedback protocol; and
5) joint TE/SS routing decision feedback protocol.

In some embodiments CLS system use existing data transport mechanisms including both infrastructure (e.g., IP, MPLS, Ethernet transport and packet-optical, 3G/4G wireless) and infrastructure-less (e.g., wireless ad hoc and Ultra Wideband (UWB) radio). In some embodiments CLS is implemented over IP including IPv4 and IPv6. In other embodiments CLS networks directly over Ethernet. This yields performance improvement in some embodiments. In further embodiments, CLS can operate over other network types, for example, over fiber, and over wireless connections such as WiFi and Bluetooth.

In some embodiments, CLS systems use several protocols between a CLS node and an IP router/Ethernet switcher (logically, in physical deployment, and/or the CLS node might be a part of the CLS enabled router/switcher), as follows:

6) protocols for collecting traffic condition (e.g., queue length) from router, in an echo-pattern like way;
7) Protocols for notifying the router about the joint optimization result, so as to let the router modify its routing by MPLS or other schemes;
8) Protocols for notifying the OpenFlow controller about joint optimization results, so as to let the controller modify the forwarding table inside switchers. In some embodiments, OpenFlow is used as a test bed for CLS over Ethernet;
9) Protocols for publishing/retrieving content to/from the CLS network; and
10) Protocols for transmitting content among user and CLSs.

In some embodiments, CLS systems include content-based naming and resolution schemes with self certifying content names, which fit the topologies of the existing networks. In an embodiment naming scheme, a self-certified binding between name, publisher and content is supported. In some embodiments, the naming scheme the format is hybrid, HTTP or flat (by hashing the HTTP name). A HTTP name is used in the User-Network Interface (UNI) and in the inter-Autonomous System Node-Node Interface (AS NNI). In some embodiments, a flat version is used in the intra AS NNI.

In an embodiment resolution scheme, a hierarchical dynamic hash table (DHT) based resolution design is used that fits the hierarchy of infrastructure networks, such as access/edge/metro accumulation/backbone. For the inter-AS portion, another global DHT is used in one embodiment. Alternatively, a hierarchical tree of Content Resolution Exchange (CREX) similar to what is implemented by a Data-Oriented Network Architecture (DONA). In the first hop (or in the local access networks), CLS also adopts a broadcast/multicast method for the name resolution in some embodiments, for example, Address Resolution Protocol (ARP).

In some embodiments, CLS systems use a cost efficient and scalable collaborative network embedded storage cloud for content storage and caching. In an embodiment, the storage cloud is logically composed of an embedded storage engine and a local and collaborative caching decision maker. The embedded storage engine is responsible for the storage of content that has not expired. The embedded storage engine resides inside network elements (e.g., DSLAM, switcher, routers) or servers placed proximately to such elements. In some embodiments the CLS storage engine can also leverage the customer terminals' capabilities.

The local and collaborative caching decision maker decides or suggests whether specific content should or should not be cached. In one embodiment, the storage capacity of each CLS node is partitioned into two portions. One portion is left to the local caching decision maker and may use a Least Recently Used (LRU) like evictor patter, and the other portion is utilized to realize a collaborative caching system, with the assistance of a collaborative caching decision maker. In one embodiment "local" means that a decision is just made according to local requests served by the node itself. In the later case, multiple proximate CLS nodes contribute some portion of their storage capacity to implement a virtual caching storage unit which is shared by all the CLS nodes in the same domain in some embodiments.

In some embodiments, CLS systems use Practical Traffic Engineering/Server Selection joint optimization for content dissemination routing. When CLS nodes are deployed by carriers that normally operate the infrastructure networks, a joint optimization solution uses content routing for some embodiments. How to respond in time and handle burst background traffic churn is handled by blocks that perform information collecting, computing, and feedback.

Using an embodiment information collecting module, CLS collects the traffic information by using a protocol for collecting traffic conditions, and user content request by a user-content request profile collection protocol. In some embodiments, the protocol for collecting traffic conditions can be applied in an Echo-pattern like way. In such an embodiment, the root of managed device tree sends a query down to the leaves. When the collected responses are sent back reversely along the tree, each sub-tree root only sends aggregated results back to its own parent node. In some large-scale embodiments where the massive scale and frequent churn of Internet traffic pattern makes it difficult to capture every dynamic change, embodiment systems devise a threshold based solution.

An embodiment computing module called CPS (Content Positioning System) that performs joint optimization in minutes, or within seconds, if possible, to determine the best routing paths between any two CLS nodes and re-direct the content delivery between them. In embodiments, CPS makes its decision for content placement (where the content should be stored) and routing re-direction (which path the content should be delivered) based on certain criteria. For example, CPS makes decisions primarily based on the knowledge it acquired from both context layer (e.g., "hotness" of the content) and underlying infrastructure layer utilization (e.g., bandwidth and congestion situation over particular physical links). In embodiments, fast response time is achieved in two ways. One embodiment method is to leverage the parallel computing facility described in the parallel computing facility described hereinbelow. Here, the joint optimization problem is decomposed into multiple sub-problems that are computed in parallel. Another embodiment method to achieve fast response time is to divide the network into multiple hierarchical sub networks, and then let each sub network compute its own optimization problem, where the upper layer network (its sub networks turn into a node) coordinates their computation.

Using an embodiment feedback method, after computing, an embodiment CLS system uses a protocol for notifying the router about joint optimization results and protocols for notifying an OpenFlow™ controller about the joint optimization results, as discussed above, in order to modify infrastructure layer forwarding/routing policies. A joint TE/SS routing decision feedback protocol is also used to notify correspondent CLS nodes (normally the first CLS hop from the customer, and potentially the CLS enabled customer device itself) to adjust its application layer routing policy. For example, the application layer routing policy can be the proportion of downloading content from one specific node. In alternative embodiments, other protocols can be used.

Many conventional access networks exhibit a tree like pattern because most traffic comes from the backbone network. An over-subscription model is reasonable for web surfing, in that each user conforms to a click-downloading-reading behavior model. In such a model, reading lasts much longer than the downloading. Therefore, other users can reuse the bandwidth for downloading. Streaming content changes this model, in that over-over-subscription becomes a large bottleneck if many customers want to watch streaming content simultaneously.

In an embodiment, CLS systems cache popular content inside each access/accumulation network so that a considerable proportion of the traffic is redirected to a local metro-area network. In one embodiment, an existing tree like Ethernet access network is transformed, by a certain degree, into a non-blocking network (for local content exchange), by using commodity hardware, for example, using 1 Giga Ethernet switches, or by using spare ports of Ethernet switches in existing metro-networks. In alternative embodiments, other hardware can be used.

In an embodiment, a parallel computing cloud facility is used for parallelized joint optimization and user-content profile analysis. Parallel computing for optimization, corresponding to an embodiment metro-area Ethernet implementation, assures that computation is completed in time in some embodiments.

Regarding collection and feedback, embodiment CLS implementations, a user-content request profile traffic collection protocol to collect the user profiles. In one embodiment, possible user requests are captured at the resolution node and logs are summarized. To some extent, the profiles can be regarded as a two-dimensional matrix in which each row corresponds to one user, and each column corresponds to one piece of content. After utilizing content usage pattern analysis, results of the computation methods are used for recommendation and/or feedback for CLS parameters self-adjustment. User behavior pattern analysis is also used for other services, for example, personalized target advertisement in some embodiments.

In some embodiment CLS implementations, an Application Programming Interface (API) is included that is open to carriers and/or third parties.

In some embodiments, CLS applications include CLS-enabled wireless backhaul, HTTP streaming video for video on demand (VoD) services, CLS over Carrier Ethernet and Fiber, and CLS interworking with a cloud data center. In some embodiments, CLS building block functions are implemented using Intel Router Brick and OpenFlow™ enabled system platforms, and CLS system software and interface primitives implemented on Linux OS. In alternative embodiments, CLS applications include other applications, implementations, and software.

FIG. 1 illustrates a functional block diagram of embodiment CLS node 100, which interfaces to other distributed CLS processing nodes and centralized controllers. Such functionalities can also be selectively supported by one specific Network Element (NE). In an embodiment, there are three controller entities, joint optimization controller 102, cooperative caching controller 104 and profile analysis facility 106, which are centralized for each domain. In an embodiment, a domain is defined as a cluster of CLS nodes that are grouped together based on certain administrative policies. In other embodiments, these functions can be provided locally or provide functionality for multiple domains. In alternative embodiments, greater or fewer controller entities, as well as other types of controller entities can be used.

In embodiments where the controller entities service a domain of multiple nodes, CLS processing node 112 is coupled to joint optimization controller 102, cooperative caching controller 104 and profile analysis facility 106 via interfaces 132, 134 and 136, respectively.

Joint optimization controller 102 collects user content requests and traffic dynamics, and utilizes optimization decomposition to periodically work out the policy for content server selection, content positioning, and traffic engineering (such as changing IP routing direction). Joint optimization controller 102 then provides notice the content routing engine 108 about such policy changes. In an embodiment, notice of policy changes helps CLS node 100 provide efficient routing.

Cooperative caching controller 104 collects user content requests and/or traffic dynamics, and works out the global optimal caching policy for each domain. In an embodiment, CLS local caching engine 110 accords to such policy, so as to contribute some portion of their storage to constitute a shared cache.

Profile analysis facility 106, which has parallel computing facilities, is used for user content profile analysis. The output of profile analysis facility 106 provides feedback to cooperative caching controller 104 in some embodiments. In further embodiments, the output of profile analysis facility 106 can also be used by other applications, for example to provide a recommendation for personalized target advertisement.

In an embodiment, each CLS processing node 112 has distributed processing entities including proxy 114, content routing engine 108, local storage engine 116, local caching engine 110, content GET/PUT adapter 118, name resolution engine 120, Dynamic Hash Tree Key-Based-Routing DHT KBR 122, topology maintenance 124, transportation engine 126, user request synopses generator 128, and traffic synopses generator 130. In some embodiments, greater or few distributed entities can be used, and/or distributed processing entities having other functionality can also be included. In embodiments of the present invention, these distributed processing entities of this category can operate independently or cooperate in a decentralized way.

Proxy 114 is a bridge between user terminals that may not be CLS enabled and the CLS network. Proxy 114 receives user requests, distributes the requests to relevant engines to process the messages, forwards the messages to the next hop (if needed), and dispatches the response to the users. In some embodiments, proxy 114 is deployed in the very edge of the network, for example, on the DSLAMS, at the first CLS hop from a user's point of view.

The core module of CLS processing node 112 is content routing engine 108, which decides where and how to get requested content wanted. Content routing engine 108 chooses between the local cache, remote CLS peers, and the original publisher. In some embodiments, content routing engine 108 uses name resolution engine 120 to get a list of possible candidates if it is determined that requested content is not in local cache. Content routing engine 108 receives instructions from the joint optimization controller 102, so as to enforce content layer routing (server selection) and the underlay routing jointly.

In an embodiment, local storage engine 116 includes storage optimized for streaming content, as well as for small sized Key-Value object storage for CLS indexing.

Local caching engine 110, which is an agent of the cooperative caching controller 104, defines local greedy caching policies such as LRU in some embodiments. Local caching engine 110 decides whether or not content is cached. In embodiments, Local caching engine 110 is also configured to evict some content due to expiration or lack of storage space. Content GET/PUT adapter 118 encapsulates the basic semantics of the storage for content, and also performs some pre-processing tasks such as operations in batch.

Name resolution engine 120 is another core module of CLS processing node 112. In one embodiment, in order to return a list of suitable nodes hosting the wanted content, name resolution engine 120 switches between three operating methods. These three operating methods include broadcasting such as Address Resolution Protocol (ARP) in a local area, DHT lookup inside a metro area or AS and some inter AS resolution mechanisms, for example, REX tree or Global DHT.

In an embodiment, DHT KBR 122, fulfils a key based routing task of DHT, by leveraging the information learned from topology maintenance module. CLS builds up the hierarchical DHT inside each AS or metro area, and each layer corresponds to some specific layer of infrastructure networks, for example, the DSLAM layer, Ethernet Switcher layer and Edge Router layer. Considering that such peers are, in fact, network elements, one hop DHT KBRs are implemented inside each cluster in some embodiments.

Topology maintenance block 124 performs CLS node discovery and status monitoring of CLS nodes. In some embodiments, topology maintenance block 124 incorporates the opaque TLV embedded in IS-IS and BGP packets, a broadcasting/multicasting method, or some configuration service assistance.

Transportation engine 126 maps CLS over the main stream and potential layer-3 and/or layer-2 communication layers. In some embodiments, Non-IP capabilities are implemented, as well. Also, in some embodiments, Transportation engine 126 includes Ethernet enhancement for metro area content networking. User request synopses generator 128 summarizes user demand for content, and sends it to joint optimization controller 102, cooperative caching controller 104 and profile analysis facility 106. Traffic synopses generator 130 summarizes background traffic information and reports it to joint optimization controller 102 and cooperative caching controller 104.

Figure 2:
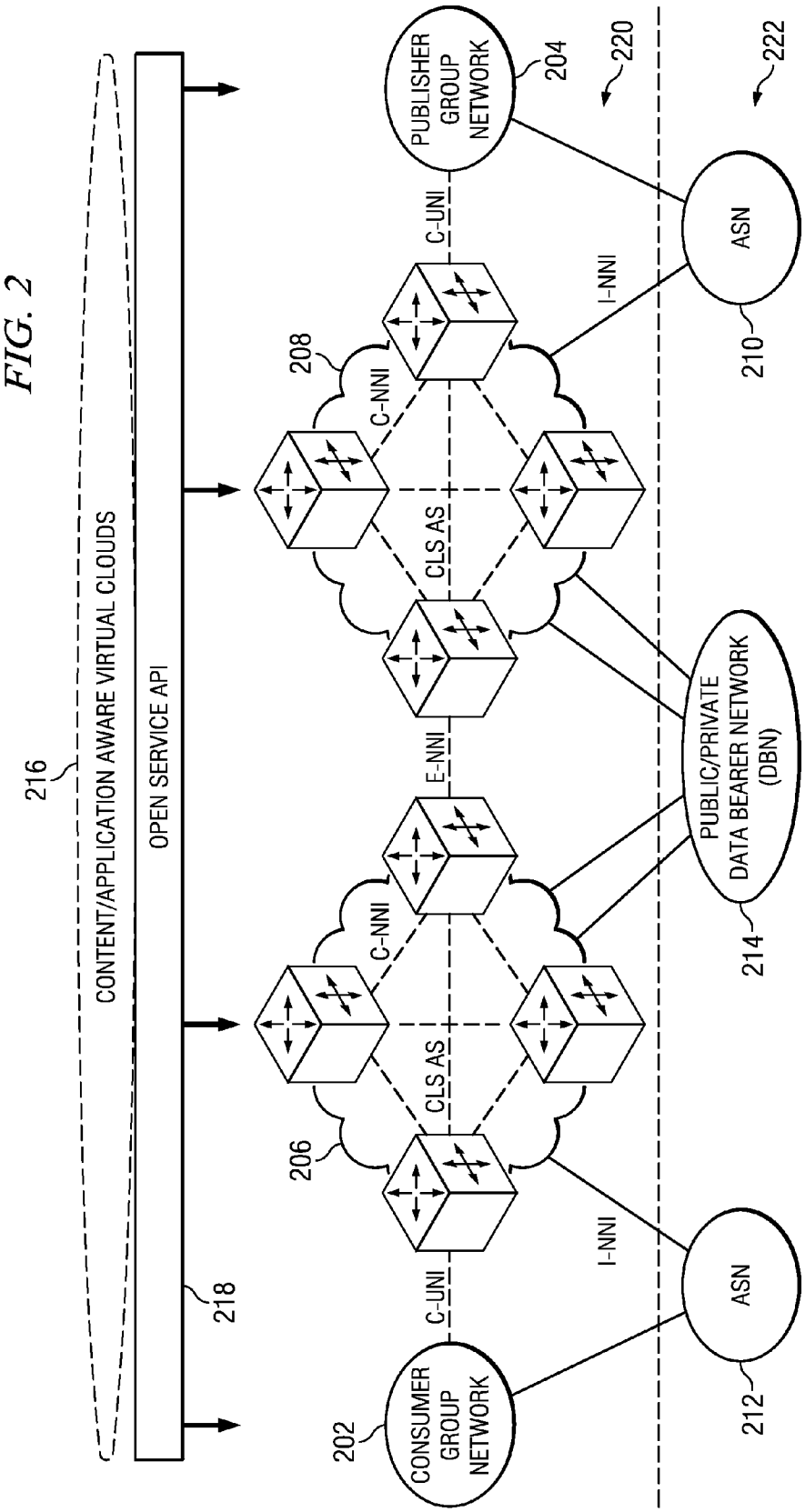
FIG. 2 illustrates an embodiment CLS reference network model.

FIG. 2 depicts an embodiment CLS reference network model. The CLS network is made of several players: consumers 202, publishers, CLS nodes 206 and 208, Access Service Network (ASN) operators 210 and 212 and data bearer network operators 214. In this network reference model, CLS network is operated as a Content Distribution Service Provider (CDSP), which may be the same provider of ASN 210 and 212 and Data Bearer Network (DBN) 214, or an independent 3rd operator having bilateral agreement with the providers of ASN 210 and 212 and DBN 214.

In this layered view, the top layer contains content/application aware virtual clouds 216 which provide service intelligence to support service requirements, service quality agreements, service brokering, service scenario and flexible service billing. Virtual cloud layer 216 uses open APIs 218 to offer consumers novel media/content experience. For example, APIs are provided to help publishers/subscriber to publish/retrieve the generated/requested contents, to offer content storage service, to provide event notification service and to provisioning CLS nodes for efficient content delivery.

Middle layer 220 is made of CLS functional entities. In some embodiments, each of these functional entities is realized in a centralized entity. In other embodiments, these functional entities may be distributed over multiple physical functional entities. Embodiment CLS content overlays may be implemented over various access technologies and data bearer technologies, such as Personal Area Network, Body Area Network, Home Area Network, Fix/Mobile access, and Metro and Core data network. CLS connects consumer and publisher via CLS User Network Interface (C-UNI) and CLS Node-Node Interface (C-NNI) and delivers content between them. Inter-CLS-AS communication occurs via an Exchange Network-Network Interface (E-NNI). To overlay with various access and data bearer network, CLS interoperates with the underline network via I-NNI. The CLS reference model depicts the normative reference points C-UNI, C-NNI and I-NNI as shown in FIG. 2. C-UNI mainly uses HTTP or other well known protocol to minimize the modification of client device. An embodiment C-NNI includes one of more of the following protocols: intra/inter-domain content based naming and resolution protocol, user-content requests profile collection protocol, collaborative cache decision/suggestion feedback protocol, user-content profile analytics feedback protocol, and joint TE/SS routing decision feedback protocol. An embodiment I-NNI includes protocols for collecting traffic condition (e.g., queue length) from router, in a Echo-pattern like way, protocols for notifying the router about the joint optimization result, so as to let the router modify its routing by MPLS or other schemes, Protocols for notifying the OpenFlow™ controller about joint optimization results, so as to let the controller modify the forwarding table inside switchers. In alternative embodiments, greater, fewer and/or different protocols can be used.

Lower layer is 222 is made of network elements, such as access point, 3G/4G wireless, core routers, MPLS switches, residential gateways, data centre switches, or even wireless ad hoc networks, etc. These elements provide underline data "pipe" connectivity for the CLS overlay. In some embodiments, lower layer 222 is a merged layer with the middle layer, for example, when all or part of its NEs are CLS enabled, or upgraded to be CLS enabled. From a user experience perspective, in some embodiments, content can be shared over any delivery medium. In some embodiments, a CLS system delivers content over any network, whether the network is an infrastructure network or an infrastructure-less network.

In an embodiment, a CLS system allows multiple implementation options for a given functional entity, and yet achieves interoperability among different realizations of functional entities. Interoperability is based on the definition of communication protocols and data plane treatment between functional entities to achieve an overall content delivery function, for example, security, "findability" or content caching management. Thus, the functional entities on either side of reference point represent a collection of control and bearer plane end-points. In an embodiment, interoperability can be based only on protocols exposed across a reference point, which depends on the end-to-end function or capability realized (based on the usage scenarios supported by the overall network).

In an embodiment, CLS uses a CL to characterize each content data, where context is an attribute-profile that associates real-time information with social objects. From a protocol perspective, CLS defines a CLL between application layer and data bearer layer. With CL as a handle, CLL is knowledgeable to deliver and to process content between content consumers and publishers. In an embodiment, CLL has two types of intelligence: knowledge from application (via CL) and the knowledge from the bearer networks (via link adaptation and integrated routing). Thus the CLL collectively couples applications with infrastructure resources and optimally utilize network topology and resources for delivering content.

Figure 3:
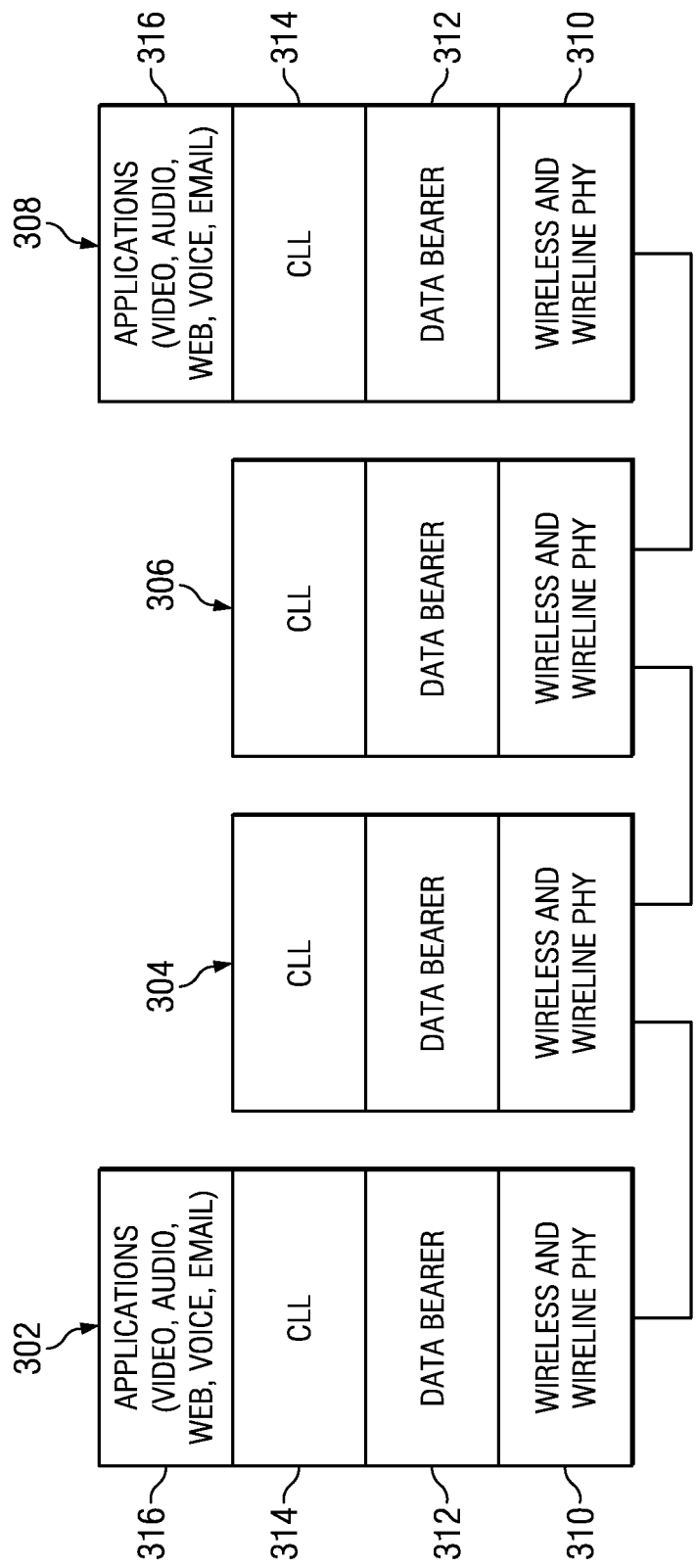
FIG. 3 illustrates networking in the context of an embodiment Context Label Layer (CLL) protocol stack.

FIG. 3 illustrates networking in the context of an embodiment CLL protocol stack. In an embodiment, the CLL provides a generic content delivery layer for a content-centric network. With a well-defined CL and limited semantic scope, CLS can control "how much" the network should learn from applications and the best balance between needed overhead and processing performance. Each network node 302, 304, 306 and 308 implements a protocol stack that includes physical layer 310, data bearer layer 312, which is a data transport layer, and CLL 314. Nodes 302 and 308 represent endpoints, for example, client nodes or data providing nodes, and have application layer 316. Nodes 304 and 306, on the other hand, represent intermediate nodes that perform routing and content storage, for example.

In an embodiment, CLS implements a distributed Content/Service-aware overlay for content delivery services. To realize "content awareness" and to control the complexity of processing content semantics, CLS treats content as a "connoted data." In an embodiment CLS system, each content data chunk is attached with a Context Label CL is defined as n-element tuple (n>=1). Each element in a CL is an attribute which characterizes the content. For example, the tuple (time, location, security) is a CL that can be used to define and/or determine whether the designated content is meaningful or not.

For example, one scenario for "connoted" movie Y is to use CL=(2-day, Singapore, key-locator). In this example, the user can only watch movie Y for two days, Y is prohibited from circulating in Singapore area and the subscriber can get public key of Y from key-locator. In some embodiments, an implicit rule can be applied using the CL. For example, after the key expires in two days the movie is no longer watchable. In one embodiment, the CL is a relational array that defines the semantic scope for the associated data. In the view of CLS, each data is not an isolated object, but rather data is characterized by its surrounding environment. In an embodiment, CLS uses CL to guide content searching, routing/forwarding, local caching and mash up processing.

Figure 4:
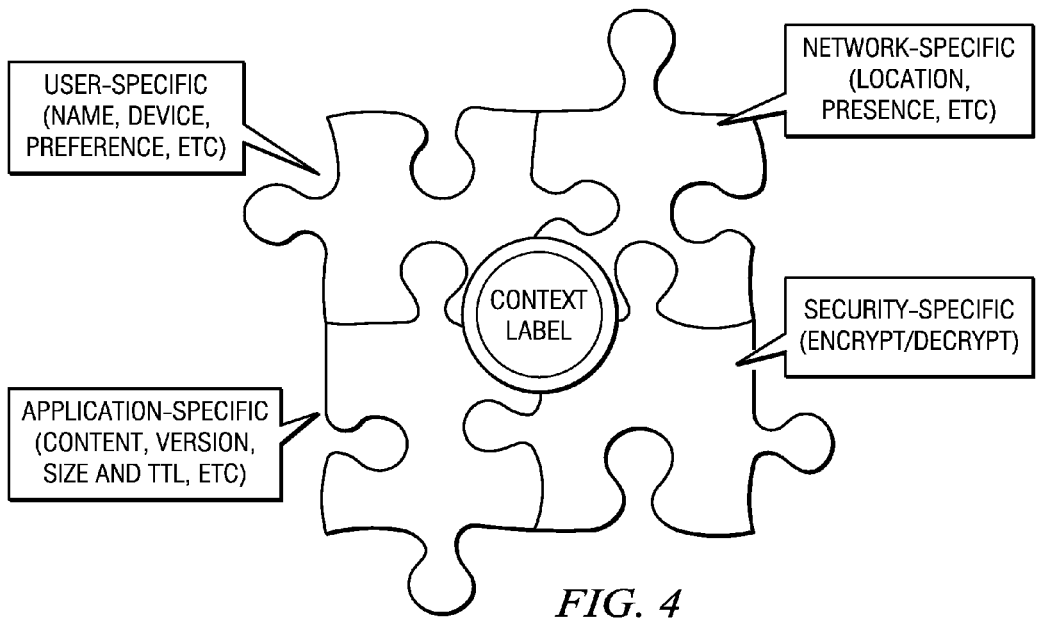
FIG. 4 illustrates content of an embodiment context label.

In an embodiment, each CL is a "meta data" which are attributes used to scope whether the content is meaningful or meaningless against a certain context when people share information using the Internet. These meta data (attributes) come from many aspects in some embodiments. For example, as shown in FIG. 4, a user-specific context may include user ID, device name and device type; network-specific context may include location and presence; application-specific context may include content name, version, size and TTL (time-to-live); and security-specific context may include security key and crypto algorithms. When content is being generated or being delivered, a CL is attached to the content as a "header." CL characterizes the relationship between content and its existing environment.

Embodiment CLs can be implemented in a variety of ways. For example, when application data is carried in HTTP, a CL-enabled extension-header can be defined for HTTP 1.0 protocol as follows:

```
http://video.aol.com/category/comedy?sem=1&ncid=AOLVDP001
/ my-iPhone:1234
my-location:GPS
security-key:%&*(
TTL: 24-hour
Signature: (HMAC | CMAC)
```

In the above example, video content is attached with a CL header, which is a list of (name:value) pairs. This example CL header defines that the video should be delivered to an IPhone at location GPS with security key. As defined by the CL, the video is viewable for only 24-hour, and the receiver has to verify the signature of the publisher which was signed using either HMAC or CMAC algorithm.

In an embodiment usage method using HTTP over CLS, a client gets a list of content names from a search engine. Next, the client enters a URL. The client device adds a CL header, which binds a node ID and an application ID, and other context information, if any. Next, the client device sends CL to all connected access interfaces. The message is propagated to all reachable CLS nodes within a certain scope, in one embodiment, until it reaches either a node with the cached content, or the node nearest to the publisher (i.e., the web server.) Next, the contents are delivered along the backward path (soft-state path established by CL-get). Subsequent updates to the local cache (i.e., saving a copy) are done at each node. In an embodiment, Any-cast and/or Multi-Point-Multipoint is performed via the multicasting message from the client and from a CLS node in some embodiments. In some embodiments, any-cast is used where content owner is not pre-known. In one embodiment, a request to a DNS is only issued by a network node and not by a client node, such that the network node will only issue a DNS if it cannot find content within the CLS system.

In embodiments, CLS systems use three core context values: Real-time, Socialization and Personalization. A carrier can utilize an embodiment context to couple real-time Internet operational semantics (i.e., where, who, when, and how) with user social objects.

In an embodiment, CLS applies hybrid content naming schemes for content delivery, with respect to the different interfaces. For example, with respect to a C-UNI interface, CLS utilizes widely used user-friendly formats such as a Uniform Resource Locator (URL) structured name in one embodiment. For a C-NNI interface within a CLS AS, CLS uses flat naming space to facilitate Multi-tier DHT name resolution. For inter-CLS-AS domain, either a structured name or a flat name can be used relying on how global naming is agreed. For CLS/non-CLS interworking, structured name should be used. Alternatively, other naming schemes can be used. In embodiments, a CLS node provides mapping functions to transform the name between structured naming space and flat naming space, if necessary.

Figure 5:
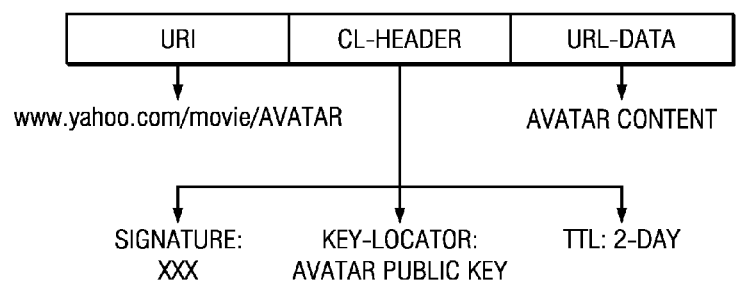
FIG. 5 illustrates an embodiment content name with a CL-header.

In an embodiment, CLS supports URL naming with extension header over a C-UNI interface, where an extension header is used for context label. Given that almost 70% Internet traffic today is carried by HTTP protocol, CLS uses URL naming for backward compatibility purposes in some embodiments. For example, as illustrated in FIG. 5, a movie publisher can publish movie URI "www.yahoo.com/movie/AVATAR" to the CLS network. Together with this ID, the publisher can define a CL-header which includes several attributes, such as a signed checksum for content authentication, the public key of publisher, and a TTL which indicates how long the content can exist in the CLS network.

Figure 6:
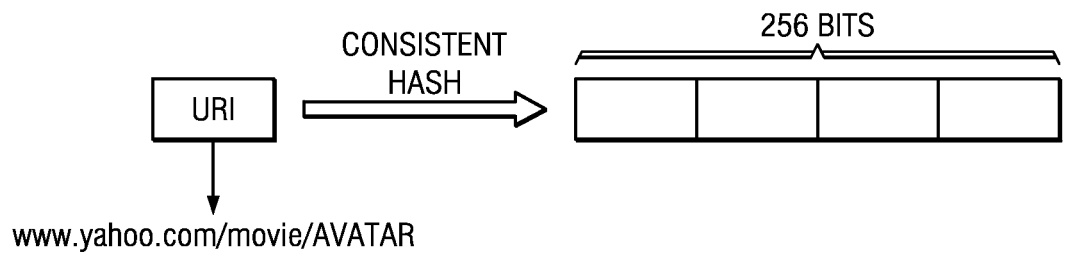
FIG. 6 illustrates an embodiment mapping between name space.

In an embodiment, CLS implements multi-tier DHT to support content resolution and distributed data storage within an AS cluster. In a DHT-enabled network, flat naming (i.e., unstructured name) is used to facilitate a content search. After a URI is received over C-UNI, CLS nodes mapping user-friendly name into multi-tier DHT flat naming space and determine where the content should be stored (i.e., publish operation) or searched (i.e., inquiry operation) in some embodiments. The CLS node creates a mapping entry between the URI and the flat name. In an embodiment, the flat name may use a signature (content name, content data) that was signed by publisher's private key. The meta data carried by CL-header is also stored together with the content name. For example, when a CLS node receives a content inquiry from subscriber, CLS translates URI to a 256-bit DHT name and finds a copy of the movie within the cluster, as shown in FIG. 6, which illustrates mapping between name spaces. After the content (e.g., a movie) is delivered to the originating CLS node by checking the mapping entry, CLS returns the movie with the URI to the subscriber.

In one embodiment, CLS inter-domain communications include two scenarios: inter-CLS-AS and CLS/non-CLS interworking. The inter-CLS-AS interface uses a global DHT flat name in an embodiment. Alternatively, a structured name is used that implements Content Resolution Exchange Point (CREX) functions with name translations similar to C-UNI. For CLS/non-CLS interworking, the structured name is applied such that content routing exchange functions (e.g., DNS) uses the structured name for further content resolution and routing. In either of the interworking cases, if an originating CLS node cannot find the content, the inquiry (with structured or flat name) will be submitted to all adjacent CREXs to execute the further search. In an embodiment CREX determines whether it should go to a further resolution or drop the search.

In an embodiment, name persistence implies that content name remains valid in case of storage location change, content modification, owner change, and change of algorithms used for naming purpose (e.g., a hashing algorithm). In an embodiment CLS system, each content data object may have multiple identifiers. For example, data may have user-friendly name using URI and an internal DHT ID=HASH (URI). In addition to the name, a data object also contains meta data (i.e., a Context Label) representing the content entity in some embodiments. In an embodiment, one attribute of a CL is a signature. The signature is a checksum function of content name and content data entity, and signed with the private key of the publisher. The signature is used by the subscriber to authenticate the owner of the content. One embodiment CLS considers two scenarios of naming persistence: one for a content data entity change, and one for content ownership change.

Regarding content data entity modification, whenever content data is updated, CLS re-calculates the signature of (Name, Content), where "Name" is kept unchanged and "Content" is the modified data entity in one example. After the modification, CLS re-publishes the updated content with the new context label. Under this scenario, the context label keeps all the other attributes unchanged but the new Signature. The name is kept unchanged. In other scenarios, other attributes are changed.

When content changes its owner or service provider, an embodiment CLS system re-calculates the Signature (Name, Content) by using a new owner's private key and replacing the key locator of Context Label by pointing to the public key of new owner. After the modification, CLS re-publishes a new CL containing new Signature and new public key. In this example, both Name and Content are kept unchanged.

Figure 7:
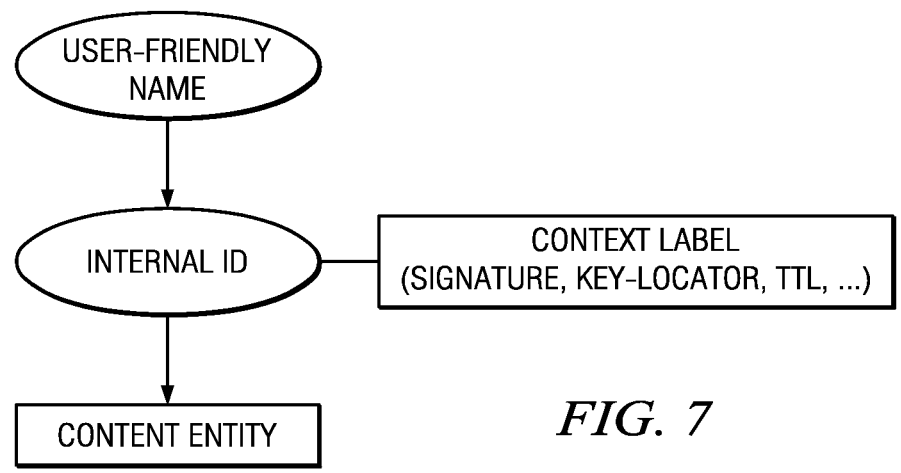
FIG. 7 illustrates content data with a multi-identifier and Context Label (CL) according to an embodiment.

In an embodiment, a CLS system has a content first networking architecture. In this embodiment, customers do not need to specify the address of the communication peer; they just request content directly by the correspondent content name as discussed hereinabove. The embodiment CLS network finds candidate sources hosting the content and gets it back to the customer using, for example, multi-path downloading. An embodiment name resolution entity answers the question of "where" such candidate sources are. "Where" here means the address of the ultimate server or even the next hop. FIG. 7 illustrates how a user-friendly name is mapped to a content entity via a multi-identifier and a context label.

Figure 8:
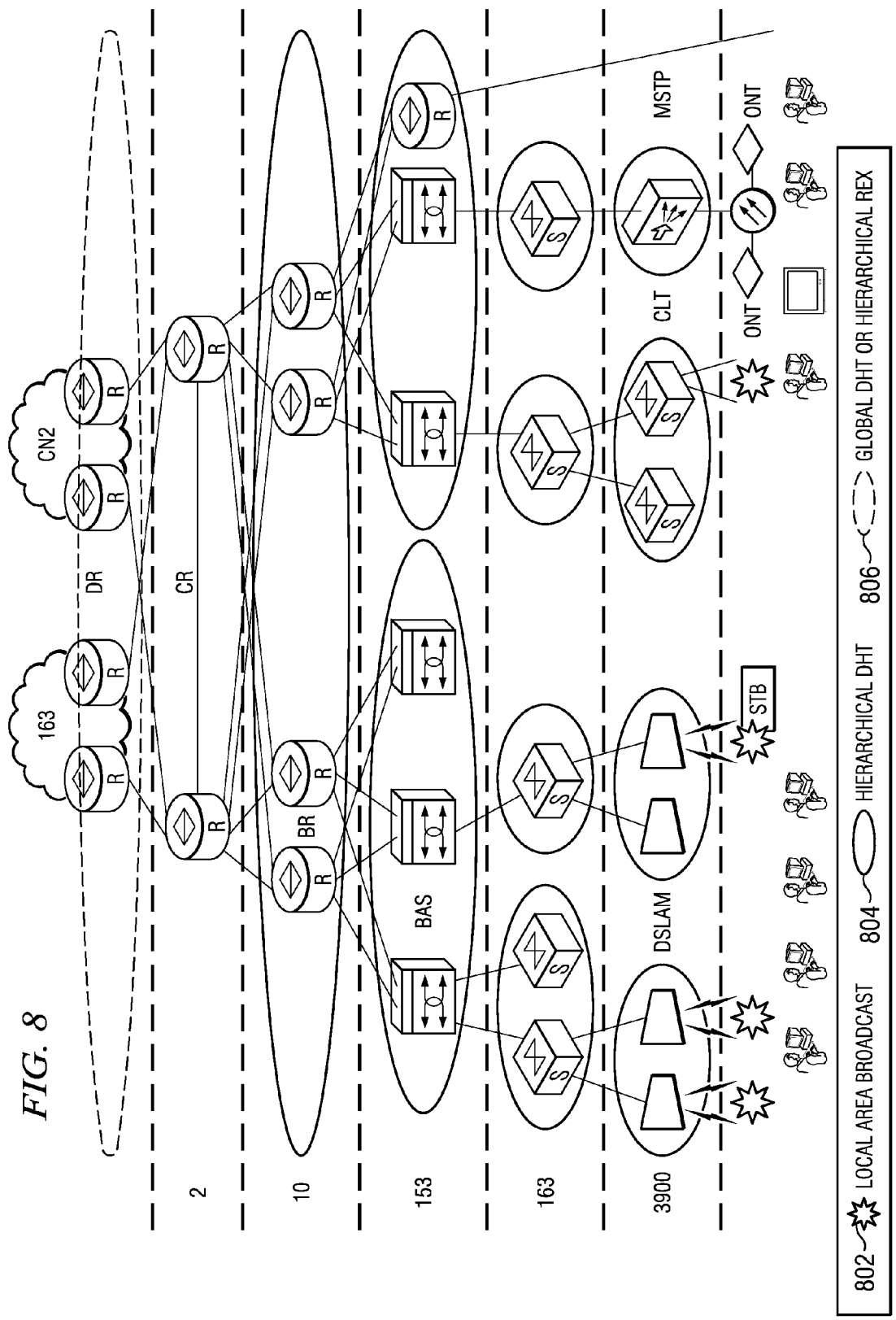
FIG. 8 illustrates an embodiment name resolution scheme.

FIG. 8 illustrates embodiment name resolution schemes for local area resolution 802, an intra AS (or metropolitan area) resolution using a hierarchical DHT based approach 804, and inter AS resolution using global DHT or hierarchical REX 806.

In an embodiment local access area resolution method, a broadcasting based name resolution is a very efficient broadcasting is naturally supported in both wireless access environment and Ethernet access networks. Considering the scalability of broadcasting, its application is limited inside each local access area in some embodiments. By using a broadcasting scheme, a user who broadcasts an interest can be responded to by anyone else (including other users or CLS nodes) who has the desired content. In some embodiments, ARP or other broadcasting based primitives, for example, can be used.

Figure 9:
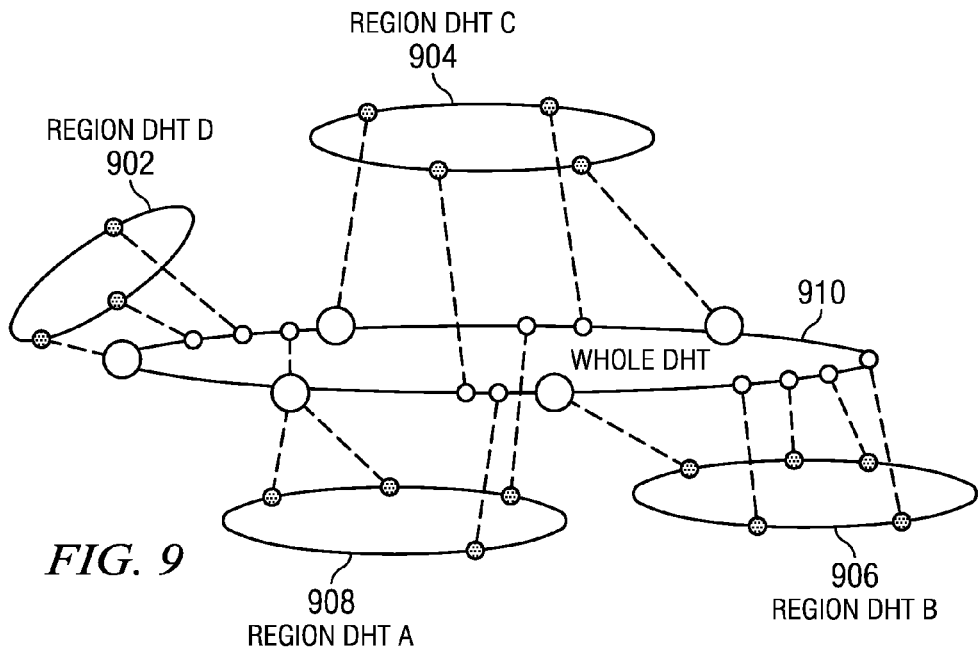
FIG. 9 illustrates a two layered dynamic hash table (DHT) according to an embodiment of the present invention.

In an embodiment intra AS (or metropolitan area) resolution, a hierarchical DHT based approach is used. The DHT hierarchy fits the hierarchy of infrastructure networks, such as DSLAMS, Ethernet Switches, BRAS, routers, etc., in some embodiments. All, or representative peers from the lower layer DHT join the upper layer DHT. FIG. 9 depicts a two layered hierarchical DHT, where all region DHT peers 902, 904, 906 and 908 join whole DHT 910 at the same time. In an embodiment, a node needing content first uses hashing to get a flat name, then performs a lookup in the lowest level of DHT to which it belongs. The node then switches to upper layer DHT to lookup more candidates if necessary. If a content resolution fails at the top DHT, the inquiry will be sent to CREX to get global resolution.

In an embodiment, Inter AS resolution another global DHT is used, which unifies the CLS name resolution design. Alternatively, a hierarchical tree of CREX is implemented. In alternative embodiments, other methods can be used for Inter AS resolution.

In one embodiment, there are two scenarios for inter-domain exchange: inter-CLS-AS domain and CLS/non-CLS domain. Inter-CLS-AS domain communication is performed between two CLS networks, while the latter is performed between a CLS network and non-CLS network. CLS implements CREX to exchange the content name resolution information across the CLS domain in an embodiment. Each CLS-AS may be adjacent to several other CLS-AS, based on the definition of CLS admin/routing domain. Within each CLS-AS cluster, some CLS nodes are designated as the border nodes to communicate with other CLS-AS via CREX. The border nodes implement inter-domain protocols to exchange information with CREX. When a new CLS node joins the AS, the new node automatically discovers all the border nodes within the AS, and the new node establishes point-to-point infrastructure connectivity with each border node. When a CLS node (a.k.a., originating node) receives a content inquiry from a user, it firstly maps the URI name to flat name and conducts an intra-domain resolution. If the content cannot be found, the originating node multicasts the inquiry to all the border nodes. The latter communicates with CREX to execute further resolution. In an embodiment, CREX is a logical entity that can be implemented on the border node or on a different box in some embodiments. In an embodiment, CREX determines how far the resolution should go and what the inter-domain protocol is used for adjacent domains. To support large scale content resolution, CREX implements content name aggregation in some embodiments.

In one embodiment, CREX inter-domain content resolution is performed by extending the BGP protocol to populate top level content name across the domain. In this case, BGP is used to exchange both infrastructure reachability and content routing reachability. The top level name represents the integrated content naming hierarchy in an embodiment. For example, the top content name is an AS-ID/content-domain or City-ID/content-domain. Opaque TLV can be extended to BGP to include the top content name. The extended BGP is installed at CLS border node to exchange the top content name and to perform inter-domain name resolution. Alternatively, BGP is run to exchange infrastructure topology information only, and other protocols are used for inter-domain content name resolution.

Figure 10:
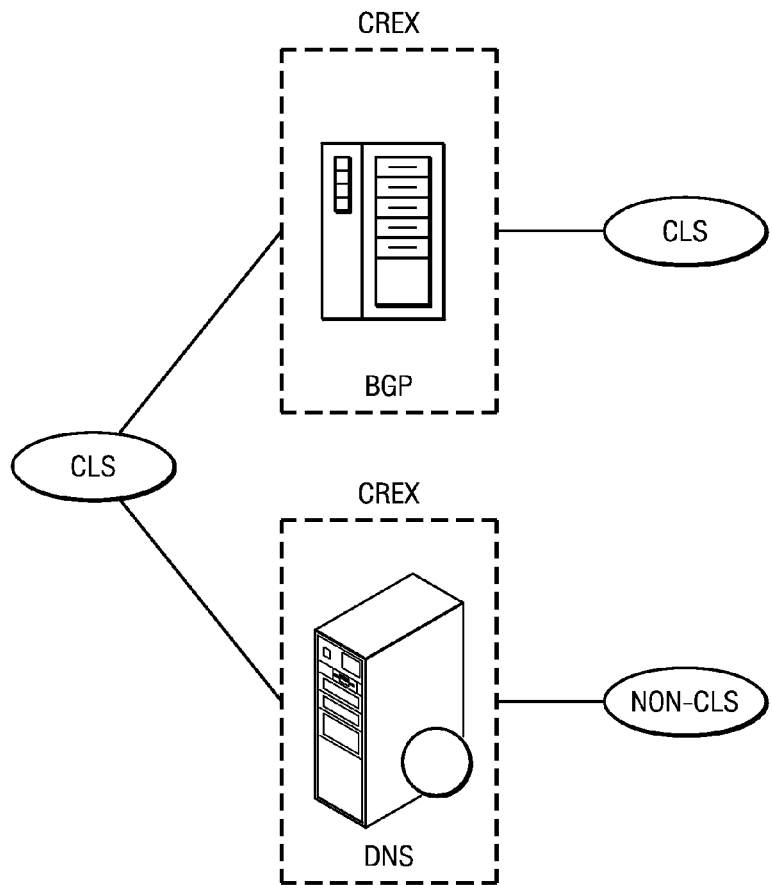
FIG. 10 illustrates a block diagram illustrating inter-domain content resolution for CLS and non-CLS systems according to an embodiment.

For CLS/non-CLS interworking, CREX can directly trigger a DNS inquiry for content resolution in an embodiment. Here, CREX uses the returned IP address to get the content from the origin server. In inter-domain cases, in some embodiments, if a CLS network cannot find the content in intra-domain, the inquiry is forwarded to CREX for further search. The inquiry is dropped if the content cannot be found at CREX. FIG. 10 is a block diagram illustrating inter-domain content resolution for CLS and non-CLS systems.

In embodiments, CLS nodes resolve a large amount of on-line content. To support this, a huge DHT or similar distributed indexing implementation composed of tens of thousands nodes is used in one embodiment. Alternatively, other name aggregation schemes can be used. For example, in one embodiment, the top content name can be an AS-ID/content-domain or City-ID/content-domain and the content domain is defined according to either geographical region, administrative domain or underlying routing domain. Each domain is managed by third independent parties in some embodiments. If the content-domain is made to be equivalent to the host name part of the URL, then the number of content names is almost comparable with the number of host domain names. In this case, a DNS server like architecture can be used in some embodiments. In embodiments that aggregate into a more abstract level (e.g., the content-domain is an aggregation of host names), then the number of top level content names will be reduced comparing to the number of DSN entries. In such embodiments, a content-centric network (CCN) can be used.

In some embodiments, CLS systems use built-in security mechanisms for content delivery using an information-oriented view of security, that is, the security is applied against the content, rather than against the "connectivity pipes." An advantage of using an information-oriented view of security is that it is suited to defend against malicious attacks to which "secured pipe" connections have difficulty defending such as Replay and Man-in-the-Middle or Man-in-the-Page, where an interceptor changes and/or frauds a message between sender and receiver. In one embodiment CLS implementation, trustworthiness comes from the content itself, not from the machine on which the content is stored. Some embodiment CLS implementations support a receiver-centric security model in which the user can decide what content they would like to receive and from whom they will receive the content.

An embodiment CLS security approach enables a user to authenticate the linkage between content names and content. For example, given a Name N associated with Content C, a publisher could create a digital signature Sign(N, C), and publish mapping triple {N, C, Sign(N, C)} into CLS network. Here, Sign(N, C) is a check sum signed by publisher's private key. For example, before the movie publisher publishes www.yahoo.com/movie/AVATAR into the network, the publisher uses his/her private key to create a signed check sum "xxx." The triple, {www.yahoo.com/movie/AVATAR, AVATA-content, xxx}, is then published to CLS. The name, www.yahoo.com/movie/AVATAR is published into a search engine like Google, as well. The subscribers then get ID "www.yahoo.com/movie/AVATAR" from Google and issue a CLS search for the movie with the selected ID. As described in previous section, the mapping triple {N, C, Sign(N, C)} is implemented in URL with CL header in HTTP. After subscriber receives the movie, he/she will use the publisher's public key to verify xxx and to authenticate the publisher, where the authentication is successful only if the publish key matched with private key for decrypting the signature. In alternative embodiments, other security methods can be used.

Figure 11:
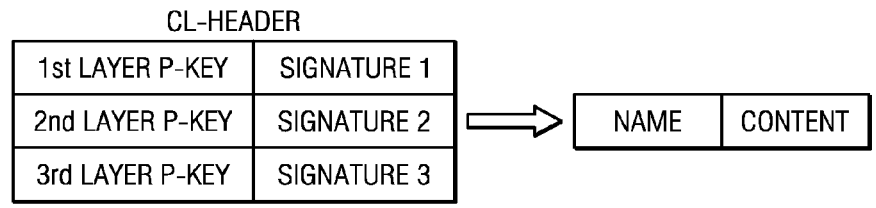
FIG. 11 illustrates an embodiment implementation of name and content authentication.

In an embodiment, this procedure is iterated based on a layered privilege security with delegation model. For example, consider that there are security domain ownership relations among a VP, Director and Employee in the content naming tree, and the VP, Director and Employee are the holders of public key 1, public key 2 and public key 3, respectively. After the Employee calculates xxx=Sign 3(N, C) and publishes {N, C, xxx}, the Director can use his private key to create a new signature yyy=Sign 2(xxx, public-key-3) and attach yyy to the content. This implies a delegation relationship between the director and the employee (i.e., director guarantees that Sign 3 is the one from the employee). In turn, the VP can use his private key to create a new signature zzz=Sign 1(yyy, public-key-2) and attach "zzz" to the content. When the subscriber receives the content, he can use top level public key (i.e., public-key-1 from VP) to verify "zzz" (which authenticates the VP is the right person who manages the director), and use public-key-2 to verify yyy (which authenticates the director is the right person who manages the employee), and public-key-3 to verify "xxx" (which authenticates the employee is the right person who is the author of Content with name N). By applying this embodiment approach CLS can support a flexible layered access privilege security management and delegation model between content publisher and the consumer. FIG. 11 illustrates an example of an implementation of authentication name and content.

In an embodiment, a CLS system creates a label header to facilitate the layered public key management. This header contains an array of entries to indicate where the user can get the public key (a.k.a., key locator). In embodiments, the key locator is a public key, or a URL indicating the CA (Certification Authority) from which the user can locate the public key. In further embodiments, other types of key locators can be used.

In embodiments, a CL-header with key locator provides CLS a flexible mechanism to support a "security delegation" model. In this model, both subscriber and publisher indicate their certification authority (CA), or delegate their CA in the locator. In an embodiment method, when labeled content (either an inquiry or data) is received, the receiver gets a sender's CA URL link (i.e., key locator) and follows the URL link to peer's delegate to get sender's public key for authentication. After executing the authentication (i.e., verifying the signature), the receiver reads the contents. Alternatively, the receiver conducts further crypto operations with the sender to exchange a symmetrical key if the content is encrypted.

In an embodiment, CLS can delegate CA to a trustable third party who is a certificate authority to represent a social community like subscribers and publishers. By providing CA URL links in CL header, CLS creates a social security control layer that verifies the social relationship between the sender and the receiver. The CA delegation can proceed in one domain if sender and receiver are in the same social society, or in multiple domains. Thus, in embodiments, CLS security is integrated flexibly with today's web-based hierarchical CA system.

In an embodiment, CLS security implements a peer-to-peer trust relationship for information networking, and performs content access privilege check associated with social trust and policies. By checking the relationship between content name and the content, and using a CL header, CLS implements a social control layer of trustworthiness which defines and verifies the social relationship between the content supplier and the consumers in some embodiments.

An embodiment content storage subsystem provides storage and caching capabilities for the content, and storage for the content name resolution items. In an embodiment, content storage capability permanently stores content until the content is deleted. The content storage subsystem can be used by CLS, for example, to provide services like Amazon Simple Storage Service (Amazon S3™). In one embodiment, a CLS system stores content by storage service first and then publishes content to a name resolution system.

In an embodiment, content cache capability is used to dynamically store content so that future requests for that content can be served faster. In an embodiment, when a CLS system requests content, if the requested content is contained in cache (cache hit), the request is served quickly by reading the cache. Otherwise, the request is routed and the requested content is fetched from its original storage location or from other locations. In an embodiment, name resolution storage capability is used by the name resolution system to store and operate the name resolution item.

In an embodiment, a CLS system has a distributed storage system for the content storage and caching. The distributed storage system has large scale Storage Nodes (SN) that provide storage resources. In an embodiment, two types of SNs are provided: a network built-in SN and a User equipment build-in SN. An embodiment network build-in SN is embedded in the Network infrastructure and may be integrated within network nodes like router or Ethernet switch. In some embodiments, the network build-in SN is implemented as a storage server with a physical link to network nodes. High availability and with low churn of this kind of SN facilitate maintenance and management in some embodiments. An embodiment user equipment build-in SN is embedded in user equipment such as personally-owned hard disk. When a user device attaches to CLS network, part of its own storage space becomes available to CLS network in some embodiments. Also, in some embodiments, user equipment build-in SNs are characterized by mobility, multi-homing and high SN churn.

Figure 12:
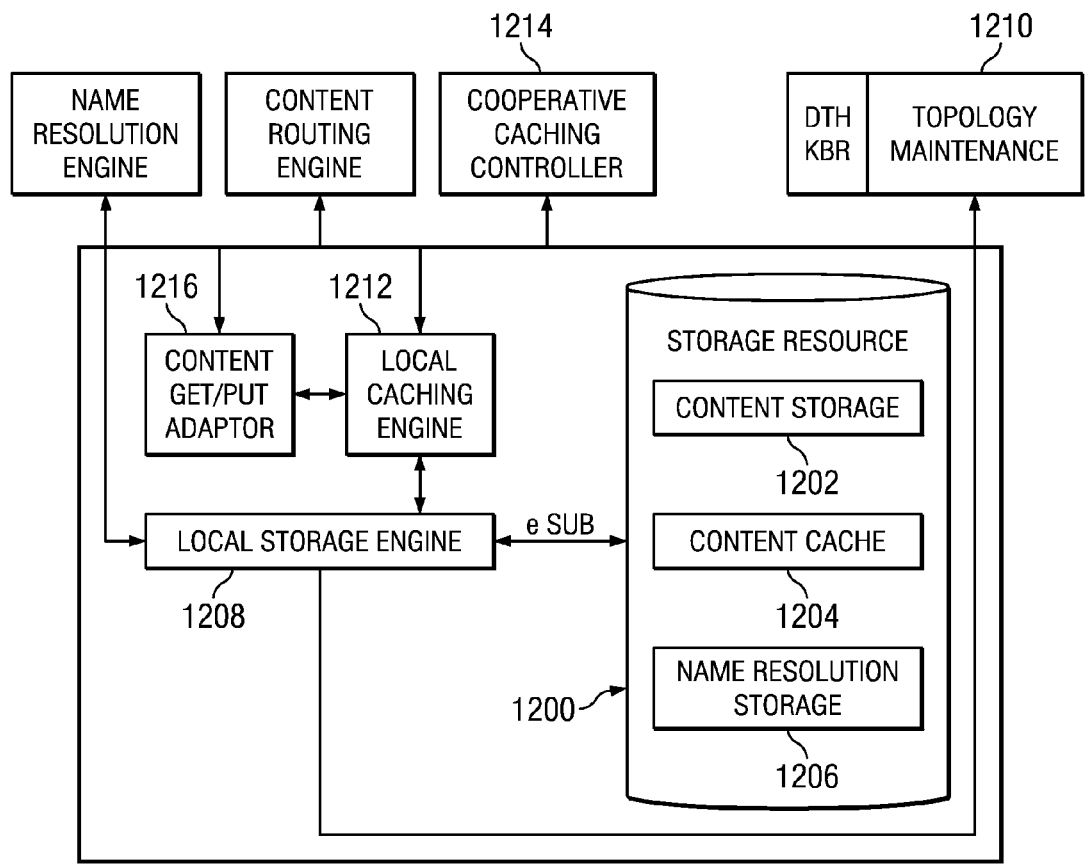
FIG. 12 illustrates an illustrates an embodiment network build-in Storage Node (SN) architecture.

FIG. 12 illustrates an embodiment network built-in SN architecture. Storage resource 1200 is made of one or more kinds of storage media such as hard disk drive, memory, Solid State Disk, for example. The determination of which type of storage media is used is determined by read-write efficiency, cost and business demands in some embodiments. Storage resource 1200 is divided into three portions for three types of data: content storage 1202, content cache 1204 and name resolution storage 1206. During operation, an embodiment SN chooses all data types or certain data types to be stored based on its own configuration. For example, some embodiment SNs may only store and cache content, while other embodiment SNs may just store name resolution storage 1206.

Local storage engine 1208 integrates local storage resource management and provides a unified data operation interface to other subsystems or internal modules in some embodiments. Local storage engine 1208 performs optimization to improve the efficiency of data access. In embodiments local storage engine 1208 informs topology maintenance subsystem 1210 of the information on local storage resource such as the data type being stored, the total capacity, and the free capacity for each data type.

Local caching engine 1212 splits the local content cache resource into two portions: non-cooperative caching and cooperative caching. The capacity ratio of two portions is dynamically adjusted by cooperative caching controller 1214 in some embodiments. Non-cooperative caching maximizes the local hit rate for highly popular content, where the content replacement strategy is determined by local caching engine 1212 itself. In some embodiments, content replacement strategy is completely determined by local caching engine 1212. For example, in some embodiments a LRU replacement can be used. Cooperative caching, on the other hand, aims to vanish cache-capacity constraints by allowing each cache to utilize nearby caches to prevent excessive replication for content. Such a content replacement strategy is determined by policy dynamically installed by Cooperative Caching Controller 1214 and the local access pattern of the content. The policy (e.g. access cost) is calculated by Cooperative Caching Controller 1214 based on the global information such as access pattern of the content, cache location, network topology and available bandwidth in some embodiments. In alternative embodiments, greater, fewer, and/or different parameters can be used.

Content GET/PUT Adaptor 1216 hides the local operational details for different types of content and provides a uniform interface to external applications.

In some embodiments, data consistency is a consideration for CLS systems, where content is stored, cached, distributed and replicated across multiple SNs. Embodiment systems track some or all of the following parameters: number of replicas of the content, placement of the replicas, access-to-update ratio, conflicting operations, network bandwidth and server utilization, and availability. The number of replicas for the original content storage can be limited by a Content Publish operation, however, in some embodiments, the number of replicas for the content cache may uncontrollable, dynamically changed and very large. The placement of the replicas is based on the geographic/topological complexity of the replica, especially with respect to content cache. Access-to-update ratio is closely related to the service property.

Conflicting operations include read-write conflicts and write-write conflicts. Some embodiment systems make sure that conflicting operations are done in the same order for all cooperative caching. Since a large number of synchronization jobs, especially for content cache, will consume large amounts of network bandwidth and server resources, network bandwidth and server utilization is taken into account in some embodiments. Regarding availability, consistency and availability may not be satisfied same time in some systems, based on Brewer's Consistency, Availability and Partition tolerance (CAP) theorem. Therefore, in some embodiment systems, if an application service needs high availability, consistency may be traded off.

In an embodiment system, content storage uses a strong consistency or eventual consistency for content storage. A user may define a consistency requirement when content is published. If a user does not define the requirement, a default consistency (based on system configuration) is applied. Another related attribute is number of replicas for the content storage which is defined by the user or by a system default value in other embodiments.

With regard to content caching, the consistency requirement is relaxed in some embodiments. For example, in one embodiment, content caching uses only eventual consistency for content cache. There are two attributes related to achieve eventual consistency. One is TTL, which defines how long a replica of content cache can live, and another is check time, which limits a SN to take no more than N ms in trying to check the new version of the content by contacting original SN. In an embodiment, N is between about 50 ms and about 100 ms. These two attributes can be defined by the user or by a default value.

In an embodiment, strong consistency provides that all read and write operations to content at the original SNs are executed in some sequential order, and that a read to content from original SNs always sees the latest written value. Eventual Consistency implies that writes to an content at original SNs are still applied in a sequential order, but reads to a content from caching SNs can return stale data for some period of inconsistency (i.e., before writes are applied on caching SNs).

Table 1 describes an embodiment interface between a SN and another subsystem:

TABLE 1

Interface between SN and other subsystems

| Subsystem | Function | Parameter | Return |
|---|---|---|---|
| Name Resolution Engine | Publish (Name, Attribute, Location) | Name: content name Attribute: optional (see following table for detail) Location: content location list or location list | Success or Fail reason |
| | Resolve (Name) | Name: content name | Location List (empty list means no match resolution entry) |
| | Withdraw (Name, Location) | Name: content name Location: content location list or location list | Success or Fail reason |
| Content Routing Engine | Put (Name, Attribute, Data) | Name: Content name Attribute: (see next table) Data: Content data | Success or Fail reason |
| | Get (Name) | Name: content name | Content data or Fail reason |
| | Delete (Name) | Name: content name | Success or Fail reason |
| Cooperative Caching Controller | Install (Policy) | Policy: access cost. | Success or Fail reason |
| | unInstall (Policy) | Policy: access cost? | Success or Fail reason |
| Topology Maintenance | Inform (StorageResInfo) | StorageResInfo: Array of <Supported data type, total capacity, free capacity> | Success or Fail reason |

Table 2 describes an embodiment attribute definition:

TABLE 2

Attribute Definition

| Attribute Category | Attribute Name | Meaning |
|---|---|---|
| Security | Signature = XXX | checksum for content authentication (see next section for security) |
| | KeyLocator = public key location | Location of the public Key checksum for content authentication (see next section for details), the public key from publisher to help the subscriber for authentication, and a TTL which defines how long the content can exist in the CLS network |
| Consistency | Consistency Type = Eventual Consistency or Strong Consistency | Define the consistency requirement for the content. |
| | CheckTime = N | Limit a SN to take no more than N ms in trying to check the version of the content by contacting original SN. |
| | TTL = T | Define a time no more than T ms a replica of the content can exist. |
| Placement | PlaceArray = { <AS=X, RepNum= N >, ...} | Define a list of placement requirement for the content. Each item means to store N replica of content in AS named X. |

Traditionally, Internet Service Provides (ISPs) mainly provide Internet connectivity and optimize traffic engineering on their networks to control how resources are used and what path the traffic will take through their networks (that is, how the traffic is routed from its source to its destination). Typically, current IP layer traffic engineering and application layer server selection respectively optimizes their own objectives and these two parties have no cooperation, which can only obtain sub-optimal equilibria. Furthermore, due to the fact that the subscribers of ISPs are becoming the subscribers of CPs, ISPs have a strong incentive to offer content to their own subscribers by deploying their own content distribution infrastructure. Based on these two considerations, embodiment methods employing joint optimization between traffic engineering and server selection provides for content routing and good user experience.

Figure 13:
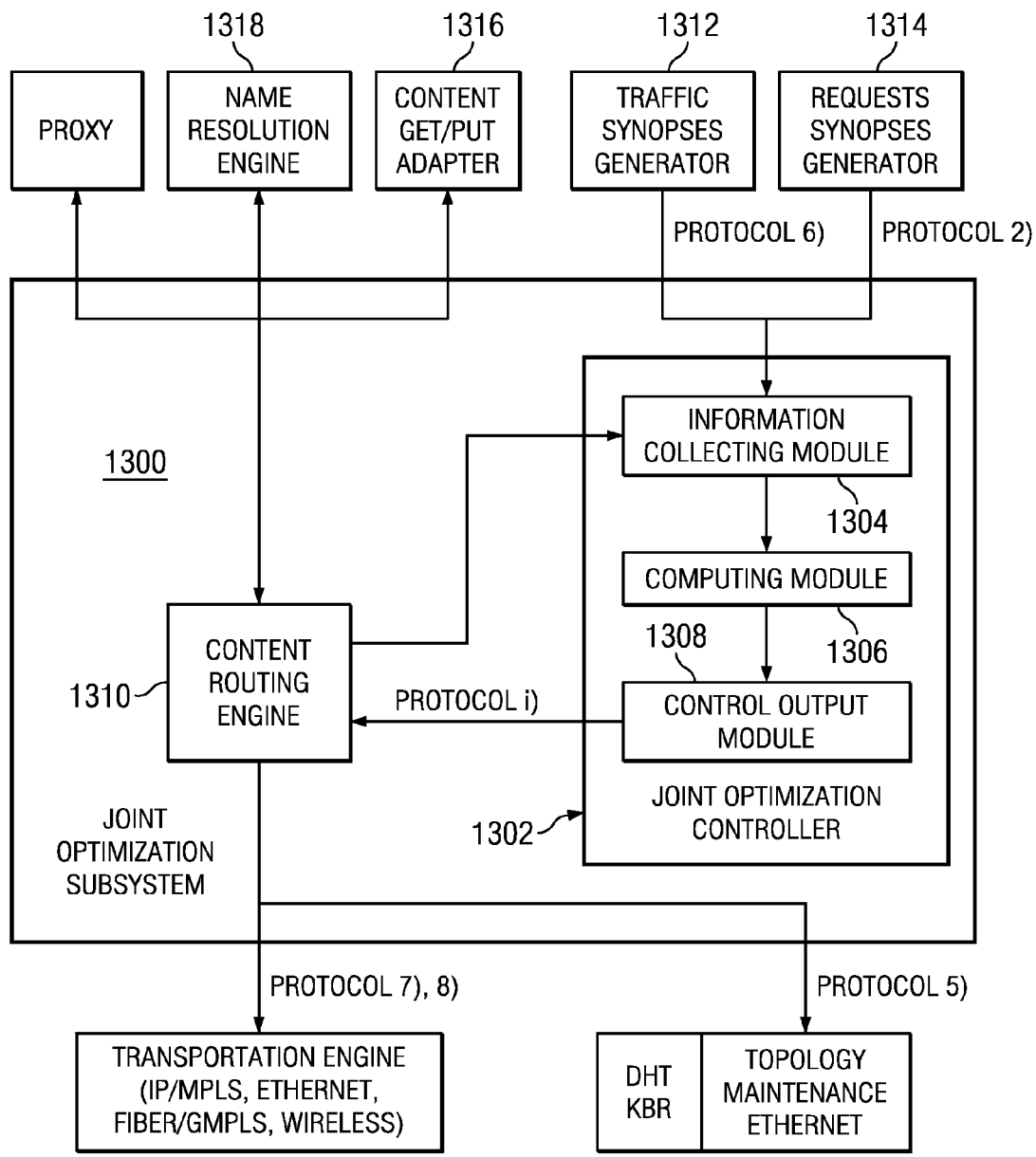
FIG. 13 illustrates an embodiment joint optimization subsystem.

FIG. 13 illustrates an embodiment joint optimization subsystem 1300, which provides an optimal policy for IP layer traffic engineering and application layer server selection. In an embodiment, joint optimization subsystem 1300 has joint optimization controller 1302 and content routing engine 1310. Joint optimization controller 1302, which has information collecting module 1304, computing module 1306 and control output module 1308, executes information collection, rapid computation of joint optimization problems, and results feedback used for network utility maximization and user experience optimization.

In an embodiment, joint optimization receives known information in order to make an optimal decision. Such known information includes a list of candidate servers having wanted content, network status such as topology information and traffic information, and request information related to user terminals. In some embodiments, server information is obtained from content routing engine 1310, and network status information is obtained from traffic synopses generator 1312. User request information is obtained from user request synopses generator 1314. Information collecting module 1302, therefore, connects to content routing engine 1310 to get the list of candidate servers, traffic synopses generator 1312 to collect the traffic information by using protocols for collecting traffic condition (e.g., queue length) from the router, in a Echo-pattern like way, and requests synopses generator 1314 obtains user content requests by using a user-content requests profile collection protocol.

In an embodiment, computing module 1306 helps to execute joint optimization calculations so as to obtain optimal results. In embodiments, three methods efficiently calculate an optimal solution. One method is to apply optimization decomposition theory to decompose the joint optimization problem into multi-level sub-problems, and solve each sub-problem directly in parallel. Another method is to apply a projection type method to find an optimal point of a convex/concave function on an intersection of convex/concave sets. A third method is to divide the network into multiple hierarchical sub-networks so that these sub-networks independently compute its own optimization problem due to their irrelevance and having the upper layer network help coordinate their computation by using bandwidth coupling. In alternative embodiments, other methods can be used to calculate an optimal solution.

In an embodiment, control output module 1308 exports optimal routing to content routing engine through a protocol. In one embodiment, a content positioning protocol can be used. The control output module 1308 exports a mapping of users and servers, the paths of each user-server pair, and the traffic proportion of each path. These optimal results will then formulate two policies, one is an IP layer routing policy, and the other is an application layer server selection policy.

Content routing engine 1310 establishes an indirect interaction with user terminals through proxy, which accumulates user requests. Such requested information eventually reaches requests synopses generator 1314. Furthermore, in some embodiments, content routing engine 1310 decides where and how to get wanted content. For example, content routing engine 1310 can request wanted content from the local cache through content GET/PUT adapter 1316. If content routing engine 1310 finds that the wanted content is not in the local cache, it uses name resolution engine 1318 to get a list of candidate servers. After joint optimization subsystem 1300 finishes its calculation and obtains optimal results, content routing engine receives instructions from a control output module 1308 of joint optimization controller 1302. These instructions are classified into two types, one is to inform transportation engine to modify the underlay routing policy by using protocols for notifying the router about the joint optimization result, so as to let the router modify its routing by MPLS or other schemes, and/or protocols for notifying the OpenFlow™ controller about joint optimization results, so as to let the controller modify the forwarding table inside switchers or both. The other type directs topology maintenance to execute content layer routing (server selection) by using protocol joint TE/SS routing decision feedback protocol or protocols for notifying the router about the joint optimization result, so as to let the router modify its routing by MPLS or other schemes.

Figure 14:
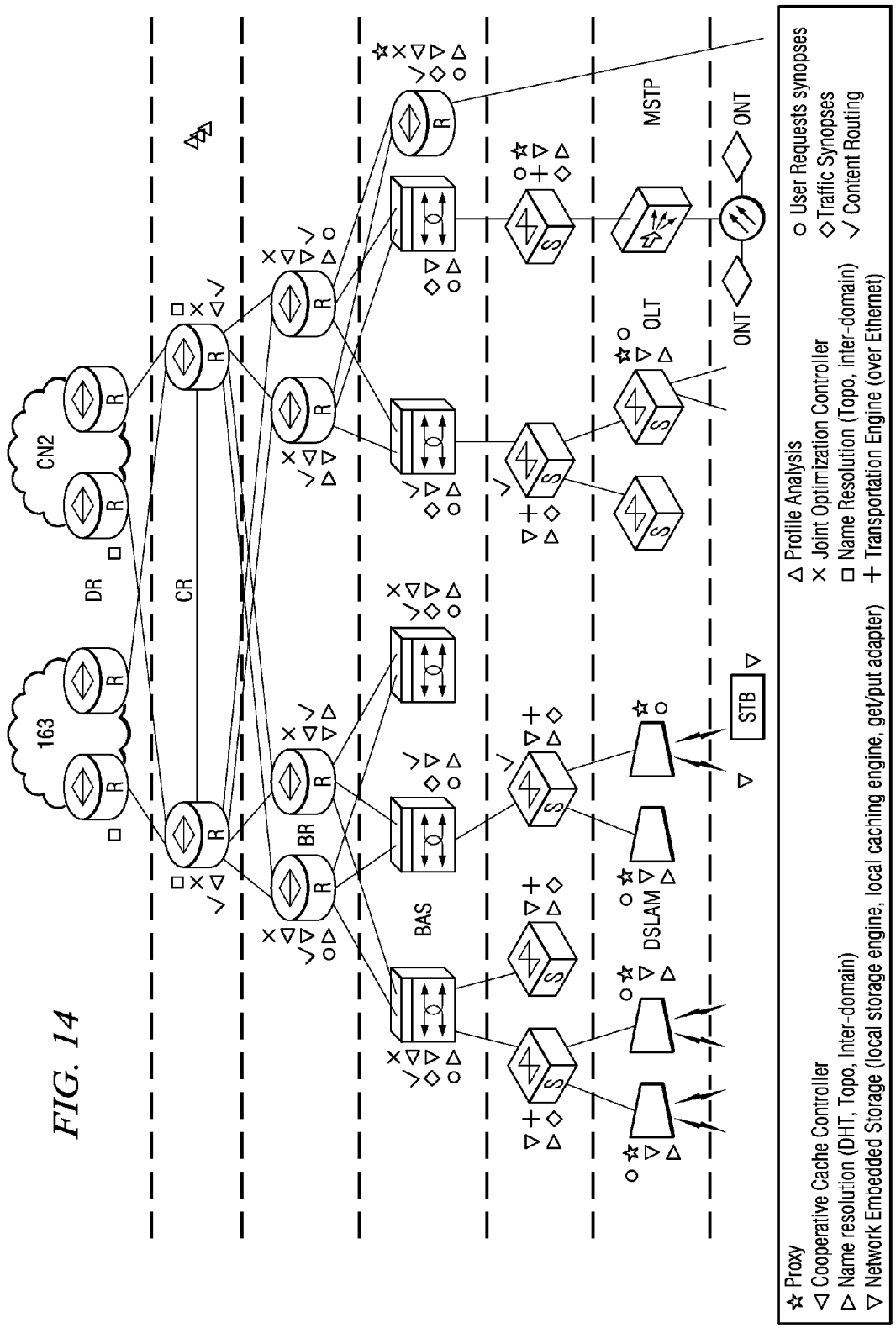
FIG. 14 illustrates an embodiment deployment mapping CLS logical entities to network elements.

FIG. 14 illustrates an embodiment deployment mapping CLS logical entities to network elements. In an embodiment, CLS nodes include many different subsystems to support content routing/resolution, content storage/caching, global inter-layer resource optimization and content service processing. In an embodiment, these functions are implemented independently and operated via a collaborative manner. In an embodiment, CLS nodes virtually organize these functions together to scale the system in the way of pay-as-you-grow.

In an embodiment, CLS Client (CC) and CLS Proxy (CP) are software modules to support content routing and content forwarding, where CC is implemented at user device and CP is implemented on CLS node. Both CC and CP implement C-UNI protocols, while CP also supports C-NNI, I-NNI and E-NNI protocols. In alternative embodiments, other protocols can be supported.

In an embodiment, CC is the middleware between applications, for example, Web, Video, Audio, and access link layer. CC implements C-UNI protocols communicating with CP, and CLL functions which add/remove content labels for each content chunk. CC can be built into a Web browser, or run as an independent software module. CC further provides link adaptation functions to manage access links and execute attachment management and mobility support. CC also provides open API to application layer to publish user-generated content, to inquire the interested content, and to adapt content delivery functions to various access links with serial or parallel operation mode (e.g., multi-homing operation). In further embodiments, CC also implements security/privacy operation such as data crypto and content authentication.

Figure 15:
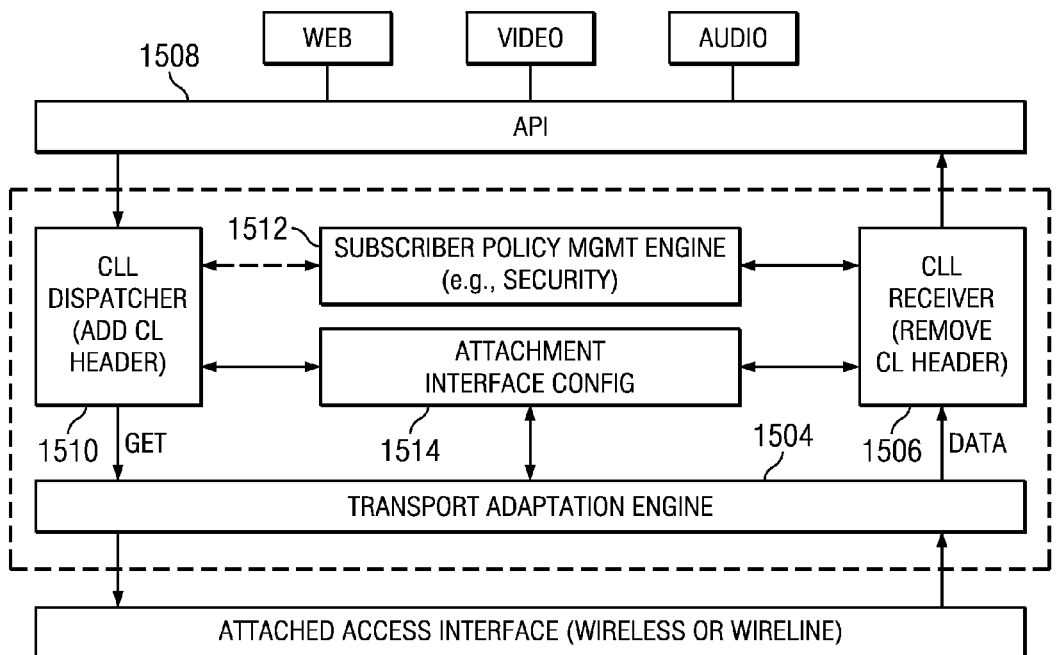
FIG. 15 illustrates a block diagram of Content Client (CC) functionality for an embodiment.

FIG. 15 illustrates a block diagram of CC functionality for an embodiment. Given an attached access interface 1502, which can be a wireless or wireline interface, transport adaptation engine 1504 receives data from interface 1502 and forwards it to CLL receiver module 1506, which removes the CL header. The data is then forwarded to a use application via API 1508. Likewise, transmitted data from API 1508 is routed to CLL dispatcher module 1510, which adds the CL header and forwards the data to transport adaptation engine 1504 for transmission over attached access interface 1502. Subscriber policy engine 1512 is used to manage per-subscriber access privilege profiles (e.g., access security and QoS enforcement), and attachment configuration interface module 1514 is used to manage user's access status (e.g., presence and location).

In an embodiment, CP is a proxy software module that implements CLS node processing functions described above. CP is responsible for content routing and content forwarding over C-UNI, I-NNI, C-NNI and E-NNI. For C-UNI, CP manages CC attachment and mobility for location-based services. CP also implements content service process for designated applications such as content mash up, transcoding and targeted advertisements in some embodiments. For I-NNI, CP implements IS-IS to support CLS topology automatic discovery and maintenance. IS-IS is also used to collect and integrate underlying infrastructure topology for CLS routing path selection and optimization. The routing integration can be done either using integrated mode (i.e., CLS and infrastructure share the same IS-IS routing database), or using an overlay model (i.e., CLS maintains an individual routing database but keeps a mapping in between). Based on the knowledge of information resource at CLS level and network topology at infrastructure level, CLS has global cross-layer optimization. For C-NNI, CP supports content naming resolution and content caching/storage functions. CP implements mapping functions between C-UNI naming space and C-NNI naming space. In alternative embodiments, other interface types can be used.

For CLS border nodes, CP implements E-NNI protocols interworking with CREX for inter-domain name resolution. In an embodiment, CP forwarding plane implements a L2/L3/L4 protocol stack to terminate/dispatch content chunks. These stacks are based on the adjacent links. Terminated packets are classified by inspecting CL-header, and the flow action engine looks up the pre-configured action table to determine where the packet should be processed. For example, after content is found from DHT resolution at remote CLS node, one copy may be made in the local cache. In an embodiment, before the originating CLS node sends the content back to the user, a mash up procedure may be executed (e.g., add some ads in the web page). In some embodiments, CLS implements OpenFlow™ management to execute policy-based forwarding, and provide open API to service layer to customize rule-based content routing. Furthermore, the forwarding plane may implement QoS policy engine to schedule the packet relaying functions with priority. In some embodiments, CL-based crypto procedures for encryption/decryption may be implemented.

Figure 16:
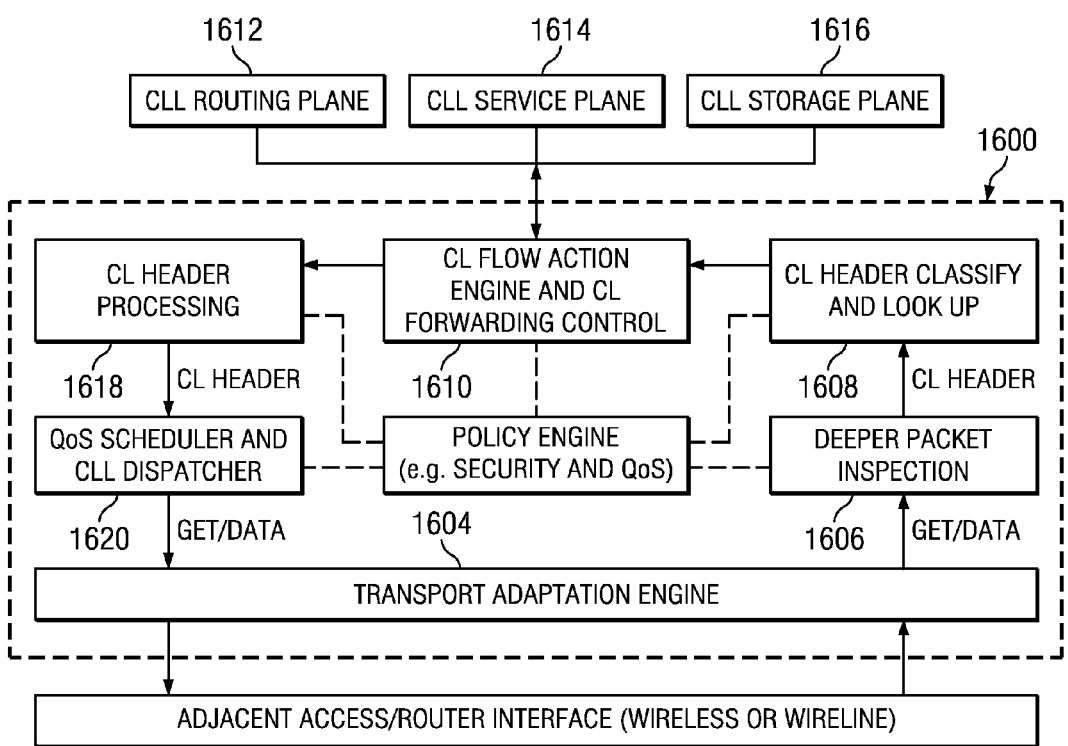
FIG. 16 illustrates a block diagram of Content Proxy (CP) functionality for an embodiment.

FIG. 16 illustrates a block diagram of CP 1600 functionality for an embodiment. In some embodiments, CP functionality is performed by software running on a context label switch (CLS). In an embodiment, transport adaptation engine 1604 receives data from adjacent access/router interface, which is a wireless or wireline interface. Deeper packet inspection is performed 1606, and the CL header is looked up and classified 1608. The data is then forwarded to CL flow action engine 1610, which interfaces to CLL routing plane 1612, CLL service plane 1614, and CLL storage plane 1616. Data is also received from these planes by CL flow action engine 1610 and forwarded CL header processing module, which applies the CL header and forwards the data to QoS scheduler and CLL dispatcher 1620. GET/DATA is than forwarded to adjacent access/router interface 1602 via transport adaptation engine 1604.

In an embodiment, CP 1600 checks to see if requested data is stored in CLL storage plane 1616. If the content is not stored locally a request is sent to CLL routing plane 1612, which initiates a request for the data externally through CL header processing block 1618, QoS scheduler and dispatcher 1620 and transport adaptation engine 1604. When the CP receives the externally requested data, the data may sent to CLL service plane 1614 via transport adaptation engine 1604, deeper packet inspection 1606, CL header classify and look up 1608 and CL flow engine 1610, in some embodiments, for example, to insert advertisements on web pages. In some embodiments, service plane 1614 performs functions such as transcoding video for clients according to the type of client hardware, base on a client provided context label. For example, a small mobile client device may require video with a lower picture resolution than a desktop computer client device.

Figure 17:
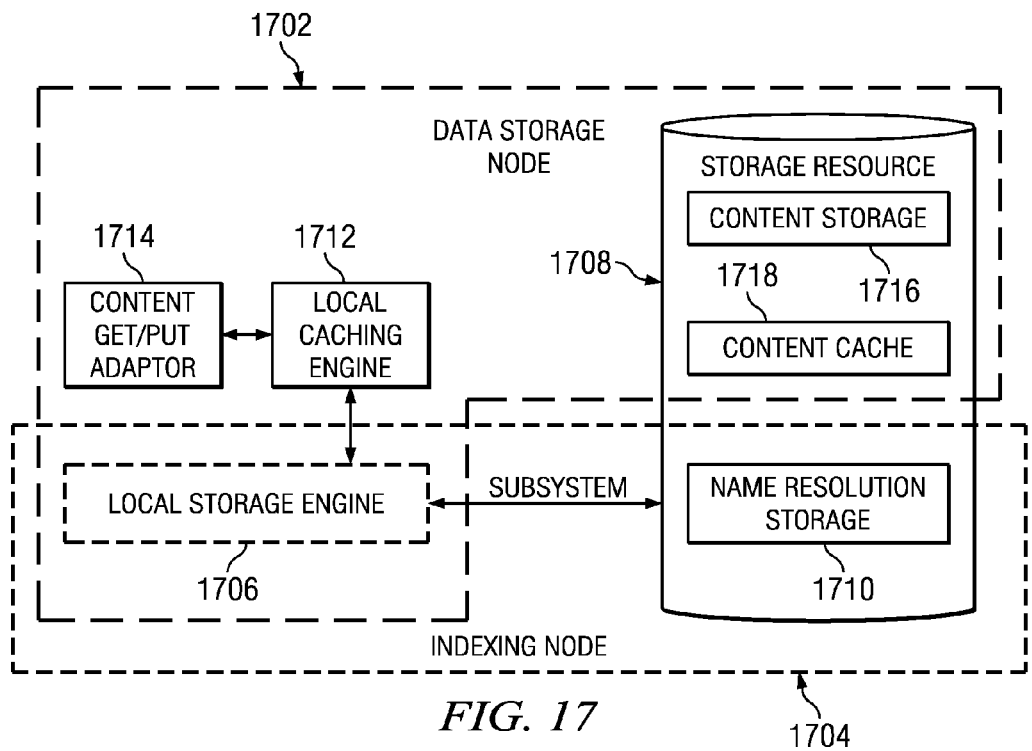
FIG. 17 illustrates an embodiment mapping of a content storage subsystem to a logical node.

In an embodiment, based on the supported storage type, each CS subsystem is mapped to two kinds of logical nodes: indexing node 1704 and data storage node 1702, as illustrated in FIG. 17. Indexing Node 1704 has local storage engine 1706 and name resolution storage 1710 within storage resource 1708. Each index node can simultaneously joins in one or more name resolution subsystems, for example, regional Multi-Layered DHT, Global DHT/CRXP, (Content Resolution Exchange Point) and stores and looks-up name resolution items belong to specific key range in some embodiments. Each resolution item has a mapping relationship between a content name and a list of content locations. Each location is a data storage node address where a replica of content stored. In such embodiments, content name resolution and content storage are logically separated.

Figure 18:
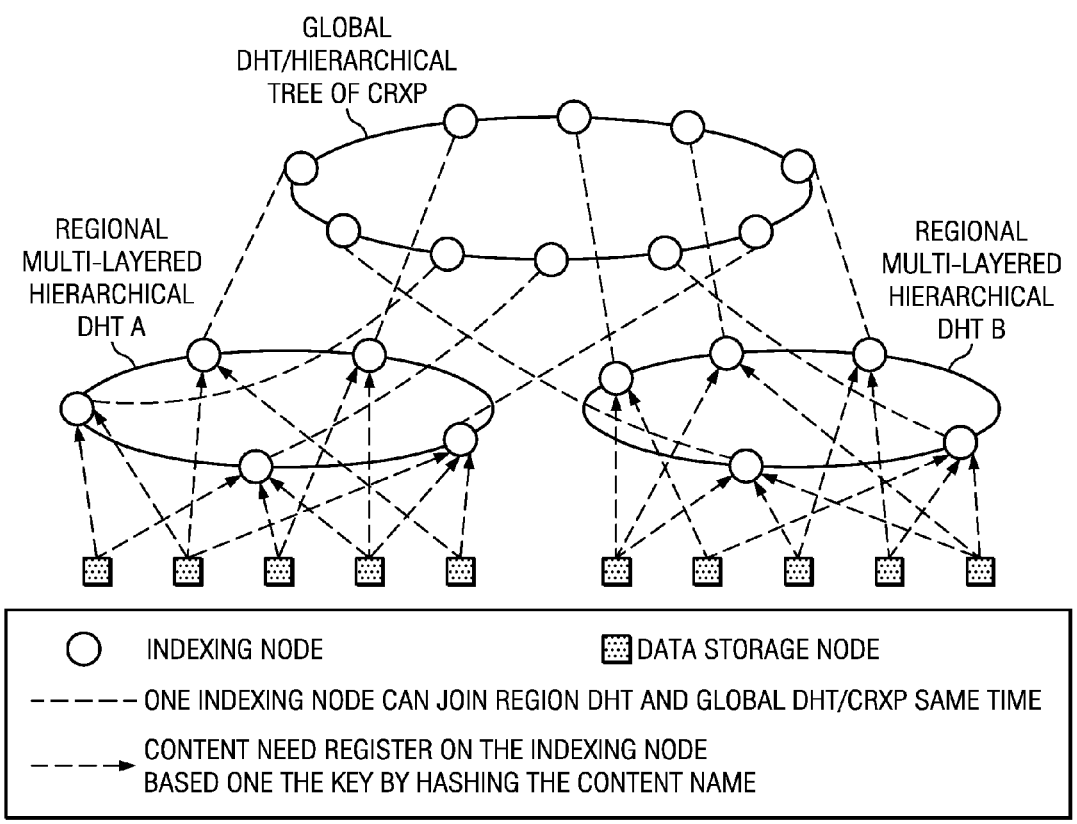
FIG. 18 illustrates a logical view of index nodes and data storage nodes according to an embodiment of the present invention.

Data storage node 1702 is made of local storage engine 1706, local caching engine 1712, Content GET/PUT Adaptor 1714 and storage resource 1708 for content storage 1716 and content caching 1718. In an embodiment, when a user attempts to publish content to the CLS system, a topology maintenance subsystem (not shown) will decide which data storage nodes should store the content based on the acknowledge of storage resources of each node and placement policy defined by user. When data storage node 1702 stores or caches content, data storage node 1702 publishes the content to corresponding indexing node 1704 based on hash of the content name. When a user tries to get content from CLS system, a content routing engine routes the content request to an appropriate SN by querying corresponding indexing node 1704 in the name resolution subsystem. FIG. 18 illustrates a logical view of index nodes and data storage nodes for an embodiment of the present invention.

In embodiments of the present invention, a CLS overlay model uses several interfaces: C-UNI, C-NNI and I-NNI. Each interface implements a group of functions that reside in different functional entities on either side of it. Specifically, two types of CLS functions are defined with respect to data plane protocols and control plane protocols. The normative protocol and the associated functional entities for each interface are specified as follows.

In an embodiment, C-UNI is the interface between CLS Client (CC at user device) and CLS Proxy (CP at network side). An embodiment C-UNI Data plane procedure supports content inquiry and content publish, based on given content name and associated context label. In one embodiment, a data plane implementation uses HTTP 1.0 with entity-header extension for CL. An embodiment C-UNI control plane procedure support CLS-access-peering discovery, bootstrap configuration and attachment management. Based on the type of physical link interfaces, CC implements a couple of protocol options for the control plane. For example, when CC attaches to IP-enabled access network (wireless and wireline), the network may broadcast a CLS operator ID as a "NSP," or CC selects NSP from a pre-configured NSP list. In an embodiment, CC could use NSP ID for network entry procedure.

During an embodiment authentication process, ASP AAA server sends CC the IP address of CP as "content home." After CC has allocated IP address via DHCP, CC establishes IP connectivity to CP to conduct further CLL layer attachment procedures. While in an ad hoc wireless network (i.e., no IP infrastructure), after the link layer association is up, both CC (at one device) and CP (at peering device) sends broadcasting messages to discover peers and use an election protocol to establish CLL association in an embodiment. An embodiment CLL attachment procedure may include exchanging configuration data such as security, boot up data, capacity negotiation and other policies. After a CLS connection is up, a heart beaten (Keep-alive) protocol can be used to maintain the attachment. When the boot up procedure is done, the CLS access point floods the attachment to all the other CLS nodes (within the same AS), thus supporting CC mobility.

In one embodiment CLS networking scenario, CC is always connecting to a CP at a CLS node, whether CLS function is implemented in an infrastructure box (e.g., access router), or CLS node is co-located with an infrastructure box.

In an embodiment, C-NNI is the interface between two CPs residing on adjacent CLS nodes within a single CLS AS cluster (a.k.a., intro-domain). In an embodiment CLS overlay model, CLS node adjacency is a logical link over an underlying L2 or L3 connectivity (saying MPLS LSP or a IP tunnel). Embodiment C-NNI data plane protocols mainly include content name resolution, content retrieval and content storage. Embodiment C-NNI control plane protocols are for overlay topology discovery and infrastructure connectivity establishment/maintenance. CLS uses Multi-tier DHT for data plane and IS-IS for topology routing, respectively, in some embodiments.

Regarding content name resolution, an embodiment naming resolution protocol uses Sandstone Multi-tier DHT protocol which maps URI-based content name to flat naming space for processing the content retrieval and storage. In an embodiment, when an originating CLS node receives an inquiry from user, it first maps a hierarchical URI to a flat name (via consistent hash) to find out where the content is stored within the CLS AS cluster, and then forwards the inquiry to the next hop to get the content. In some embodiments, CLS may implement one-hop resolution. If full-name mapping cannot determine the next hop (i.e., CLS cannot find the content in local domain), the originating node forwards the inquiry (with the full structured name) to the designated CLS border node. The border node will bubble up the search to a neighboring CLS domain or to the non-CLS domain via CREX. If the border CLS node cannot find the content, the inquiry dropped in some embodiments. The details of embodiment inter-domain protocol are described with respect to I-NNI hereinbelow. The originating CLS includes URI with CL header in inquiry message when it is sent to the targeting CLS border node.

Regarding CLS topology discovery and formation, in one embodiment, CLS assumes that the underlying infrastructure network is IP-routing-capable, whether it is an IP router, a MPLS/GMPLS, or an IEEE 802.1aq-enabled Ethernet transport. CLS implements extended IS-IS with opaque TLV for CLS node boot up and automatic topology discovery. The opaque TLV includes CLS node neighborhood information such as node ID, link capability, the designated border node ID/address, and node type (e.g., a border node), etc, in some embodiments. When a new CLS node joins the network, it floods IS-IS LSA with an opaque TLV via connected IP network. This LSA will be populated within IS-IS AS domain to notify all the other CLS nodes that a new node is added in. All the pre-connected CLS nodes receive this TLV and establish a new link in their routing database to reach to the new node. As well, via exchanging LSA database with the connected IP router, the new CLS node can acquire all the topological information of pre-connected CLS nodes. With such an embodiment automatic discovery procedure, a new CLS network topology is formed and synchronized in all CLS nodes (a.k.a., topology convergence). If DHT implements one-hop reachability, the CLS forms a fully mesh topology. On the other hand, if DHT implements multi-hop reachability, the CLS forms a partial mesh or ring-like topology.

Regarding mapping between CLS topology and transport topology, C-NNI protocol is overlaid over an I-NNI platform. By using Multi-tier DHT and extended IS-IS protocol, each CLS node holds two routing topologies: one from CLS layer and one from an underlying IP layer. The CLS node can effectively map CLS layer topology to the IP transport topology. This mapping refers to inter-layer optimization in some embodiments. In some embodiments, CLS implements transport adaptation engine functions to support inter-layer routing, mapping and optimization to any data bearer network. IP transport connectivity between any two CLS nodes can be established either on-demand, or by pre-configuration, depending on which control capability is provided by the underlying networks.

In an embodiment system, I-NNI represents an interworking interface between adjacent CLS nodes and overlaid infrastructure node. The control plane of I-NNI is an IS-IS protocol that manages the adjacent topological links for the overlay networks. The transport adaptation engines of CLS node discover, establish and maintain L2/L3 connectivity for various adjacent links. Based on the type of data bearer network, the data plane protocol encapsulates/de-encapsulates CLS messages to/from underline L2 or L3 data packets protocols. An embodiment CLS node supports L2/L3/L4 protocol stacks. For CLS intra-domain routing, the path between CLS nodes can be pre-configured or created on-demand. For example, IP GRE tunnel is established between two CLS nodes via an OAM&P system, or a MPLS LSP path is created via RSVP signaling protocol. As described previously, IS-IS running in a data bearer network exposes underlying topology information to the CLS layer. In embodiments, the topology information includes links, link bandwidth availability, and other QoS parameters. With such knowledge, embodiment CLS nodes select a best path to reach the next hop CLS node.

In an embodiment, E-NNI represents a content resolution exchange interface between CLS border nodes within different CLS AS, or between CLS border node and the adjacent non-CLS data networks. In both cases, the resolution protocol is implemented via CREX functions in some embodiment.

For CLS inter-domain content routing, a CLS border node uses extended BGP (with opaque TLV) to exchange both IP reachability and content resolution reachability with CREX. Alternatively, a CLS border node only uses legacy BGP to exchange IP reachability while implementing a global DHT resolution protocol for content reachability with CREX.

In an embodiment, when CLS border nodes connect to a non-CLS network, CREX functions as a DNS agent. After a CLS border node receives content inquiry from an originating CLS node (within CLS AS cluster), it triggers DNS request to the non-CLS domain to get the IP address of the original destination and forward the inquiry to the targeting server. Once it gets the content back, the border node sends the received content back to CLS originating node. In an embodiment, CREX is responsible to determine whether the further inquiry should continue or drop the incoming request, based on the exchange policy.

In embodiments of the present invention, CLS workflow analysis includes a CLS boot up procedure for user initial entry, CLS topology automatic discovery, CLS content publish and inquiry, and CLS content naming and routing in both intra-domain and inter-domain.

Figure 19:
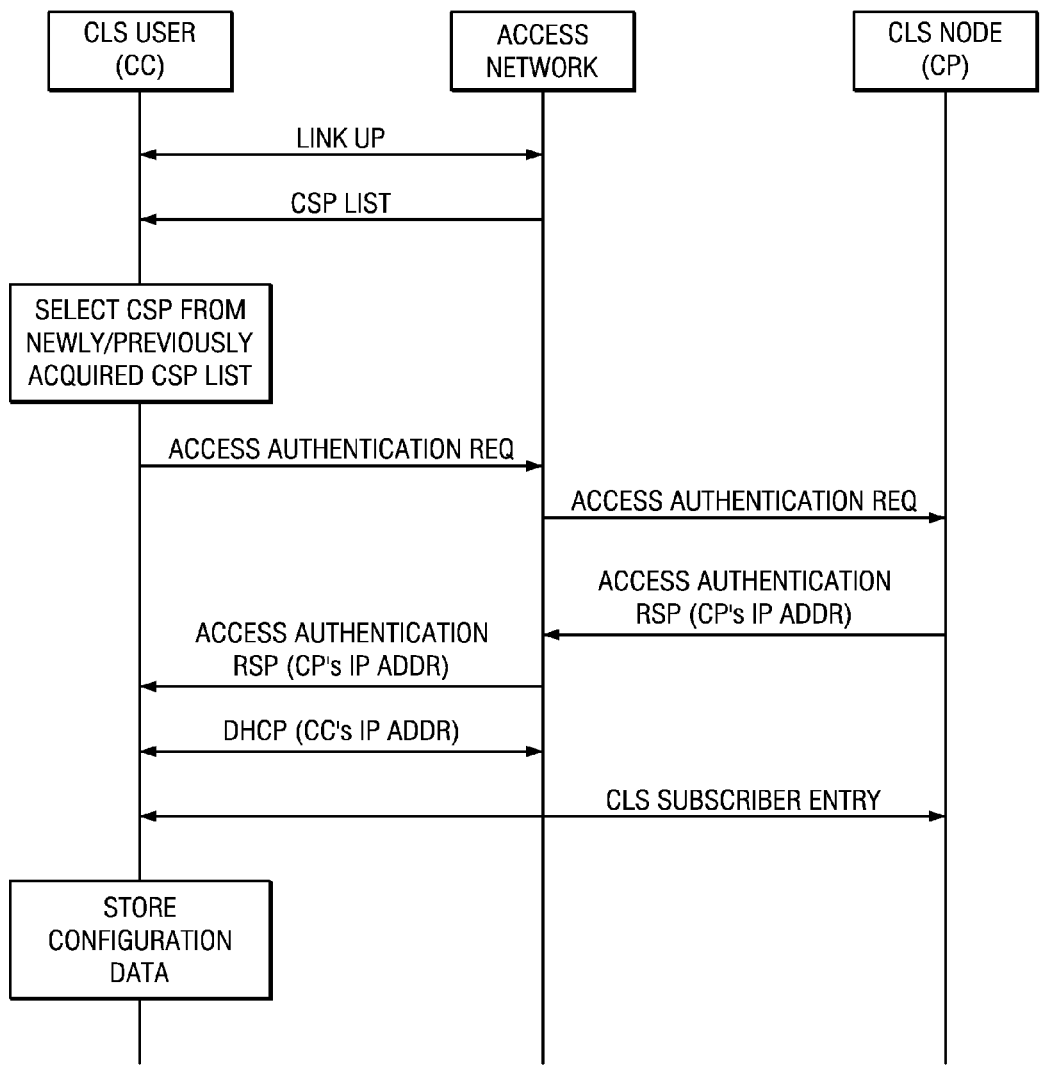
FIG. 19 illustrates a diagram depicting an embodiment CLS user initial entry procedure.

FIG. 19 illustrates a diagram depicting an embodiment CLS user initial entry procedure. In an embodiment access entry discovery and selection method, a CLS user (i.e., CC on user device) discovers a CLS Service Provider (i.e., CP on CSP's CLS node). This embodiment procedure is typically executed on a first time use, initial network entry, network re-entry, or when user transitions across different CLS domains. In a first step CC detects one or more available CLS CSP or CC detects CSPs via a stored configuration acquired from a previous entry or configured by CLS management system. In some embodiments, the CSP list may be broadcasted from access network such as WiFi, LTE or WiMAX. In a second step, CC identifies all accessible CSPs and selects a CSP based on some preference criteria. In one example, preference criteria include CSPs that have a bilateral agreement with the access network operator. In a third step, CC performs more concrete processes procedures with access network. In a fourth step CC becomes authorized on the selected CSP for service subscription and creates a business relationship enabling access via the selected CSP. Finally, in a fifth step, CC acquires and stores the configuration information.

Figure 20:
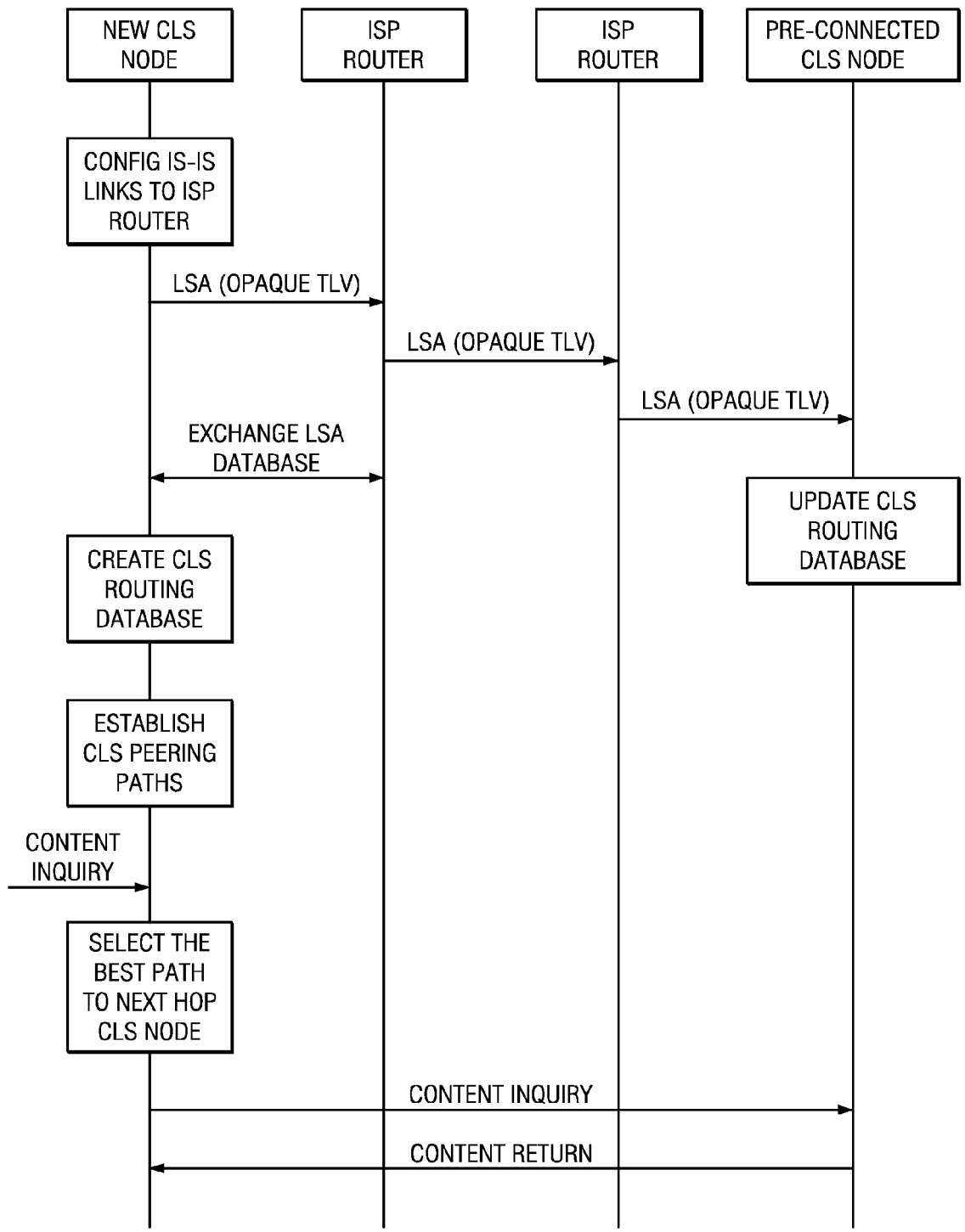
FIG. 20 illustrates an embodiment CLS topology auto discovery diagram.

Turning to FIG. 20, an embodiment CLS topology auto discovery diagram is illustrated. An embodiment CLS AS domain is defined by content naming resolution area (i.e., DHT routing domain), which is scoped by geographical range or administration domain. In one embodiment, the join or leave of a CLS node causes all the CLS nodes (within the AS) to update the routing database and to synchronize the changes. In one embodiment, during a first step, the CLS node connects to ISP routers and configures IS-IS links. In a second step, IS-IS (on CLS new node) sends LSA with opaque TLV which include CLS neighborhood information. Next, in a third step, ISP routers flood LSA to all adjacent nodes. Specifically, this TLV is sent over a CLS link at far end pre-connected CLS node. In a fourth step, far end CLS creates a CLS-adjacent link with the new node and updates its routing database, and in a fifth step, a new CLS node is synchronized with attached ISP router by exchanging LSA database. The new node creates a CLS routing database from LSA DB that contains all pre-established CLS links (with opaque TLV). In an embodiment, the new CLS node holds two topologies: one for CLS layer and one for underlying IP routing domain. During a sixth step, from routing database, the new node creates peering adjacent links to all the other CLS nodes by calculating the best paths (assuming IP layer t support QoS routing). In a seventh step, when a CLS node receives content inquiry, it uses DHT protocol to determine the designated next hop and to forward the inquiry to the destination over the selected path.

Figure 21:
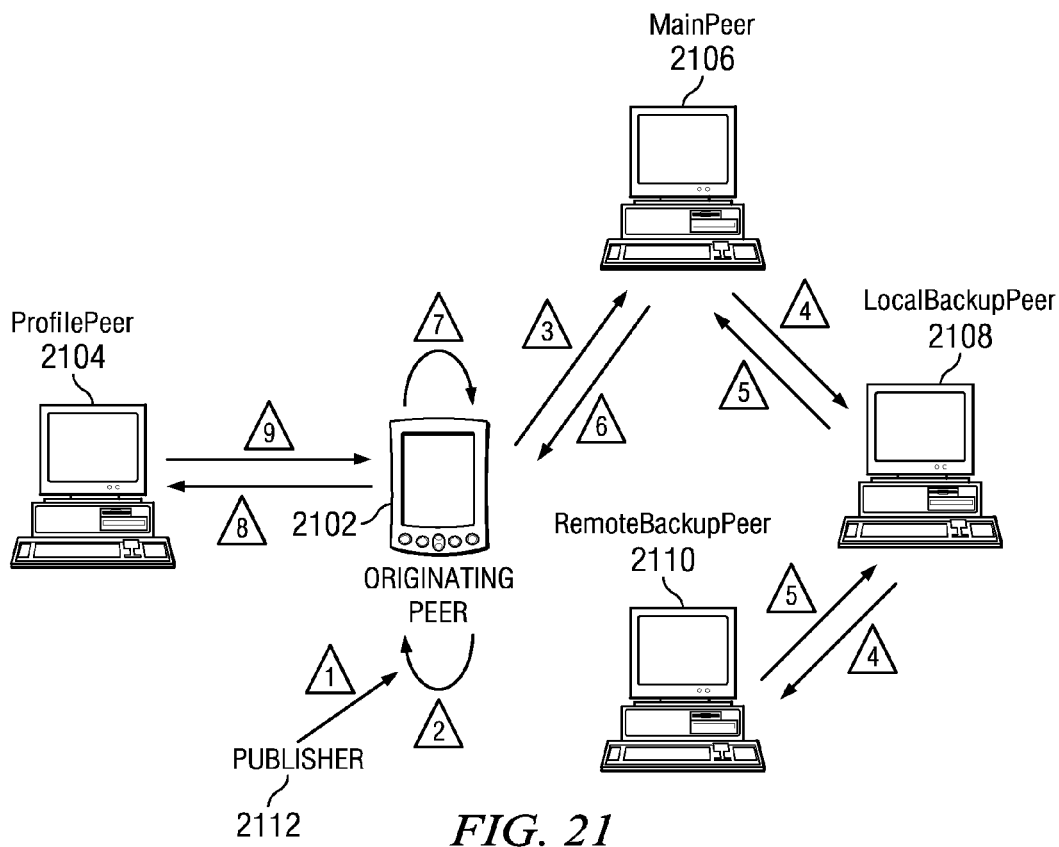
FIG. 21 illustrates distributed content storage according to an embodiment.

In an embodiment, CLS uses distributed content storage, as illustrated in FIG. 21. For example, a CLS node creates content storage under two scenarios: one is when CLS clients publish a new content to the network; and the other is when the local cache makes a local copy after a successful retrieval. In FIG. 21, peer nodes 2102, 2104, 2106, 2108 and 2110 are implemented as CLS nodes. Originating peer 2102 is the CLS node that receives published content from an attached client.

In an embodiment method, publisher 2112 publishes content to CLS node. Next CLS node 2102 (originating peer) divides the content into pieces, and determines the destination peers (one primary peer 2106 and two backup peers 2108 and 2110) to store the pieces based on one-hop routing table. Next, Originating peer 2102 sends the pieces to the primary peer 2106. Primary peer 2106 then sends the pieces to the backup peers using infrastructure network connectivity, and backup peers 2108 and 2110 send results back to the primary peer node to get content. Primary peer 2106 then sends the results back to originating peer 2102, and originating peer 2102 determines the destination profile peers (one primary peer and two backup peers) to store the profile data of this piece based on one-hop routing table. Lastly, originating peer 2102 sends profile data to these profile peers.

The procedure of making a copy at local cache is similar to what is described above, except that the trigger is issued from the CLS node which makes the local copy, instead of from the publisher client, in some embodiments.

Figure 22:
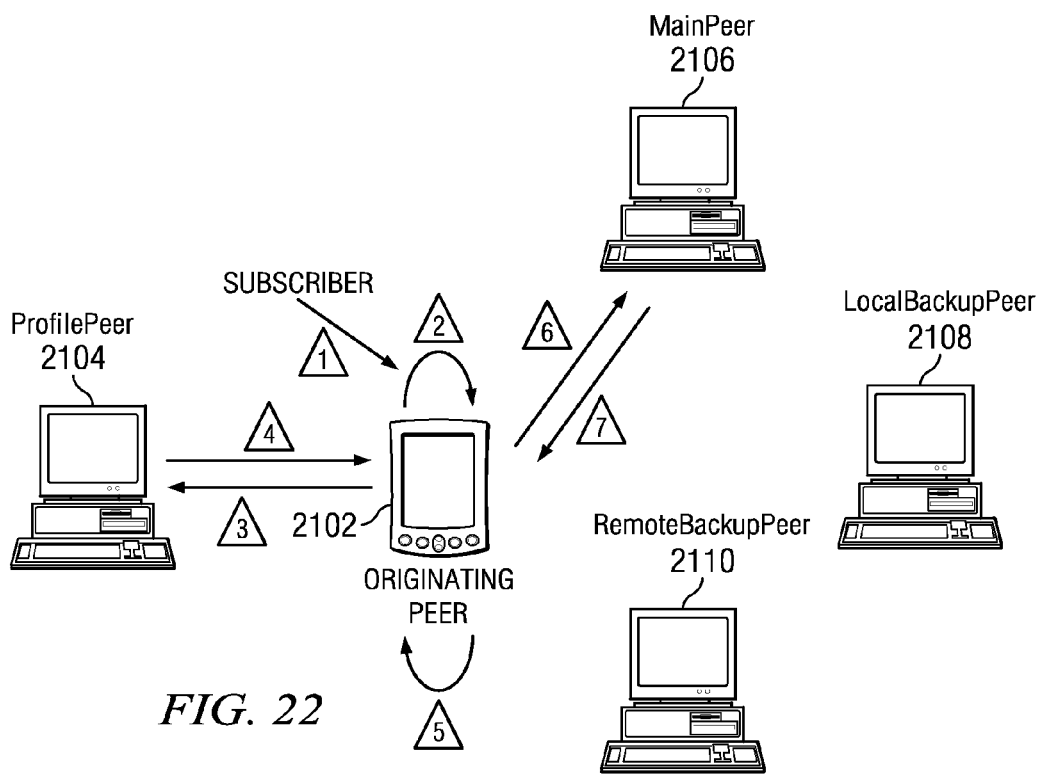
FIG. 22 illustrates distributed content resolution and access according to an embodiment.

FIG. 22 illustrates distributed content resolution and access for an embodiment of the present invention. In an embodiment, after content is resolved by originating peer, an inquiry is forwarded to the destination CLS node (Main peer 2106). Main peer 2106 then sends the content back to originating peer 2102. First, a subscriber issues an inquiry, then originating peer 2102 determines profile peer 2104 that stores the profile of the interested content. Next, originating peer 2102 sends a request to profile peer 2104 to get the attributes of the content pieces. For example, the request can be a request for a total number of pieces, in one embodiment. Profile peer 2104 then returns the results, and then Originating peer 2102 determines the destination nodes that stored the interested content (i.e., Primary and Backup CLS nodes). Next, originating peer 2102 then sends a request to primary node 2106 to get the content. If Primary node 2106 fails, the request is sent to backups 2108 and 2110. Main peer 2106 then sends back the content to originating peer 2102. In turn, the content is sent back to the subscriber.

In one embodiment, a CLS node is implemented by using leading technologies from Multi-core computing servers, distributed local caching and advanced routing framework. In one embodiment, a CLS node is implemented using an Intel RouteBricks platform, which has a software-defined router with high-speed parallel processing capability by using Intel's multi-core computing technology. In one embodiment, 35 Gbps parallel routing capability is used. One RouteBricks based CLS embodiment is fully programmable using a Click/Linux environment and some embodiments can be built from off-the-shelf, general-purpose server hardware. In one embodiment, the architecture allows routing capability to linearly scale up.

Figure 23:
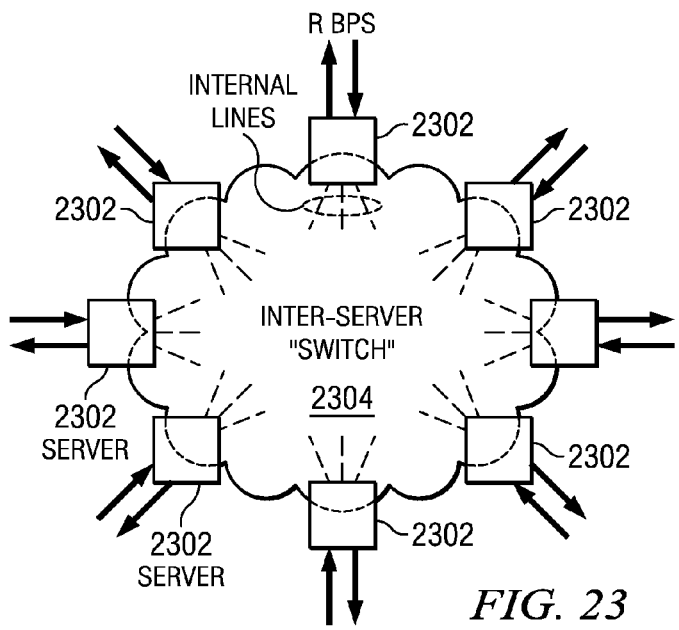
FIG. 23 illustrates an embodiment cluster router architecture.

FIG. 23 illustrates an embodiment cluster router architecture having servers 2302 interconnected by inter-server switch 2304. In an embodiment, the cluster router is implemented using RouteBricks to form high-speed switch fabric to connect servers 2304. In an embodiment, the servers are NIC cards; however, other server implementations can be used in other embodiments.

Figure 24:
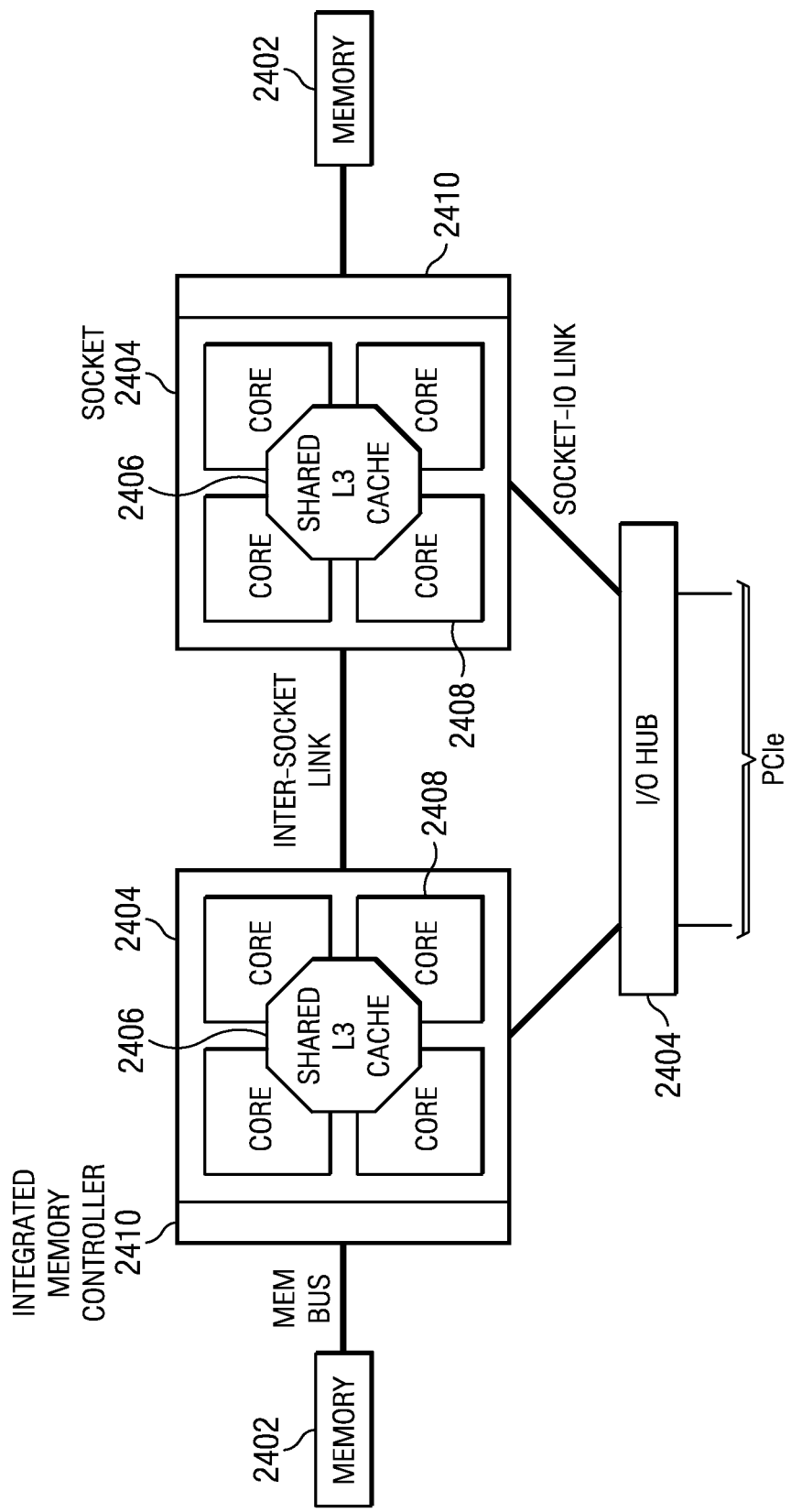
FIG. 24 illustrates an embodiment cluster router.

FIG. 24 illustrates an embodiment cluster router. Each server has multiple processing cores 2408, arranged in "sockets" 2404. All cores 2408 in a socket share the same L3 cache 2408. Each socket 2404 has integrated memory controller 2410, connected to a portion of overall memory space 2402 via a memory bus. Sockets 2404 are connected to each other and to the I/O hub via dedicated high-speed point-to-point links. Finally, I/O hub 2404 is connected to the NICs via s set of PCIe buses.

Figure 25:
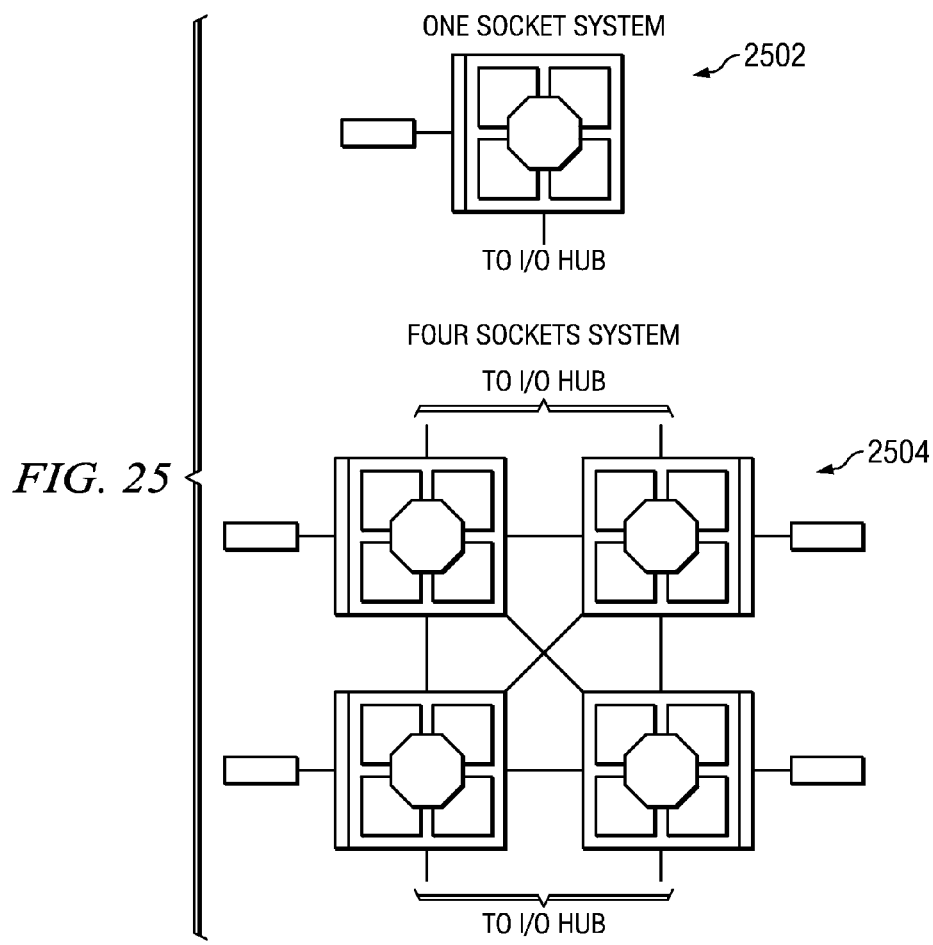
FIG. 25 illustrates further embodiment cluster routers.

FIG. 25 illustrates various alternative embodiments including one socket system 2502 that includes a single socket, and a four socket system 2504 that has four sockets. In alternative embodiments of the present invention, any number of sockets can be used in a system depending on the system's specification and environment.

Figure 26:
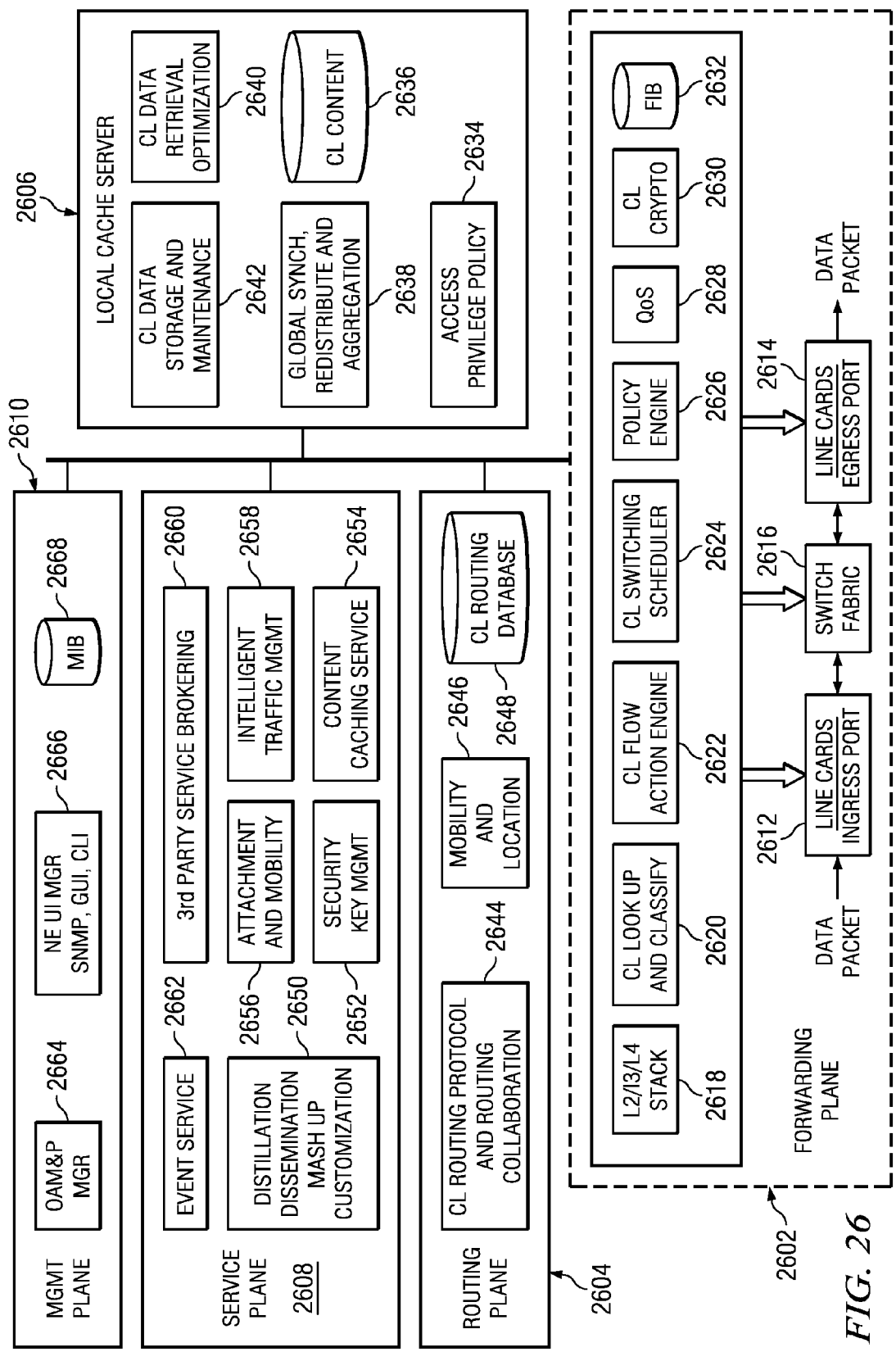
FIG. 26 illustrates a block diagram showing an embodiment architecture of a CLS.

FIG. 26 illustrates a block diagram showing an embodiment architecture of a context label switch (CLS). Embodiment CLS functionality includes flow-based content forwarding represented by forwarding plane 2602, content routing protocols represented by routing plane 2604, distributed local cache management for content retrieval and storage represented by local cache server 2606, content service processing (e.g., mash up, transcoding and adaptation/customization) represented by service plane 2608, and management plane 2610 that provides OAM interface for OSS in one embodiment. In alternative embodiments, CLS may also provide open API for content flow management and for 3rd party brokering services.

In an embodiment, forwarding plane 2602 has L2/L3/L4 stack 2618, CL look up and classify module 2620, CL flow action engine 2622, CL switching scheduler 2624, policy engine 2626, CL crypto module 2630 and Forwarding Information Base (FIB) 2632. These modules interface to line cards having an ingress port 2612, switch fabric 2616, and line cards having egress port 2614. Forwarding plane performs operations that affect CL flow in some embodiments.

Routing plane 2604 has CL routing protocol and routing collaboration module 2644, mobility and location module 2640 and CL routing database 2648. In some embodiments routing plane 2604 performs some functions similar to that of conventional routers. Routing plane 2604 also performs infrastructure routing, as well as content routing integrated with infrastructure routing in some embodiments.

Service plane 2608 has event service module 2662, distillation dissemination mash up customization module 2650, third party service brokering module 2660, attachment and mobility module 2656, security key management module 2652, intelligent traffic management module 2658 and content caching service module 2654. Service plane 2608 processes services such as mash up and advertisement. For example, in some embodiments, service plane 2608 performs advertising insertions onto web pages depending on the context information from the client.

Local cache server 2606 has CL data storage and maintenance block 2642, global synch, redistribution and aggregation module 2638, access policy privilege policy module 2634, CL data retrieval optimization module 2640 and CL content module 2636. In an embodiment, local cache service module provides local cache and storage for the CLS.

Management plane 2610 has OAM&P module 2664, NE UI manager module 2666 and Management Information Base (MIB) module 2668. In alternative embodiments, greater and/or few modules may be used. In further alternative embodiments, other functionality can be incorporated within the system software.

In one embodiment, a CLS system achieves a balance between CL overhead processing and system performance for routing throughput. In an embodiment, a CLS node is a "router+server" platform, in which content flow for forwarding and relay is processed at CL header level, which means the termination of L2/L3/L4 stack. The incoming content inquiry is searched in local cache (or shared storage) to determine if there is a local copy to be returned. In addition to relay and inquiry functions, each UNI-faced NIC card can also participate in content service processing tasks such as mash up. CLS design may also facilitate other leading-edge technologies such as Deep(er)PI and open flow management for CL-based content forwarding. The following figure depicts the mapping relationship between CLS software and Route-Bricks hardware.

Figure 27:
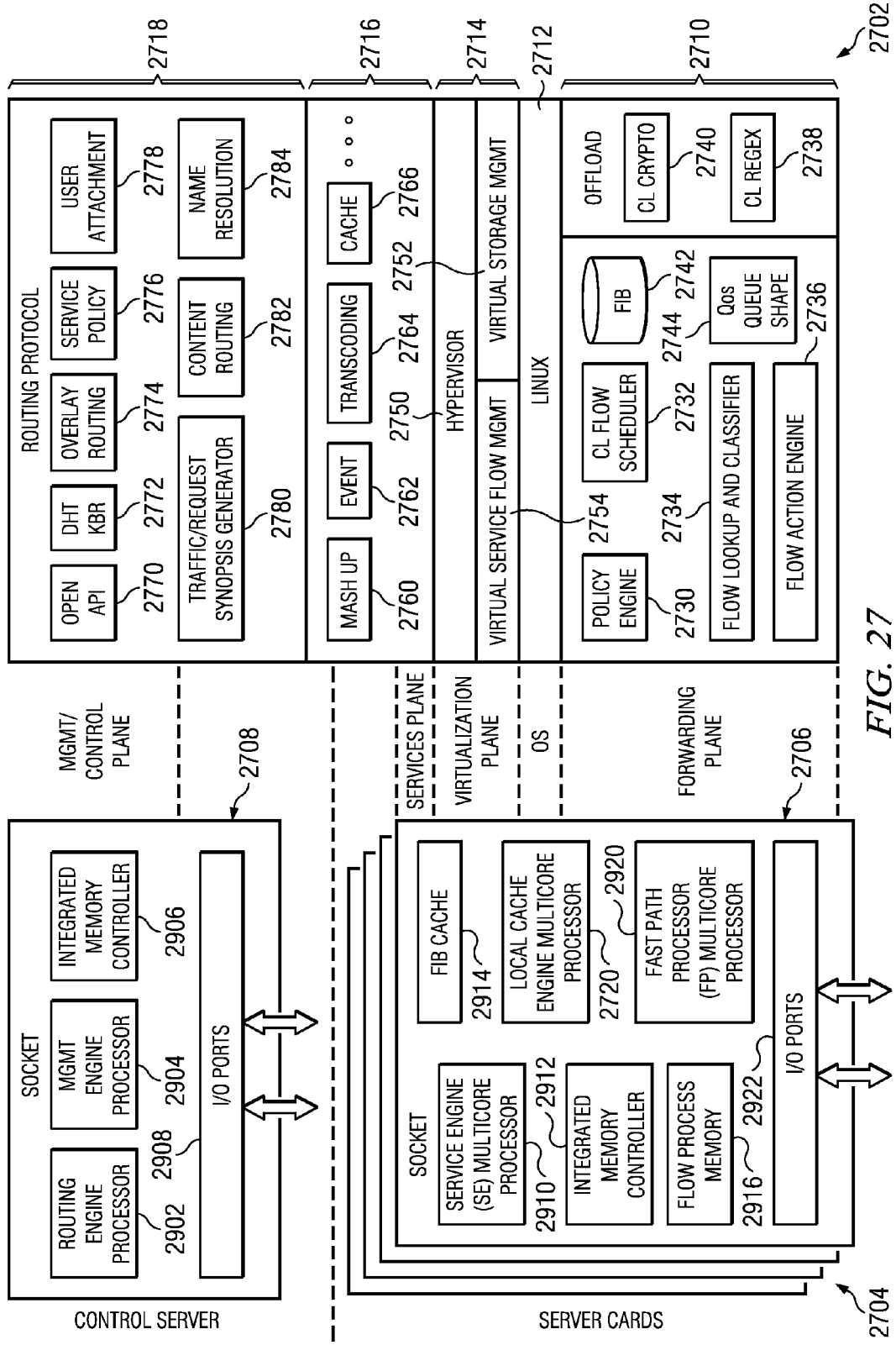
FIG. 27 illustrates an embodiment mapping of a system software package onto hardware.

FIG. 27 illustrates an embodiment mapping of system software package 2702 onto hardware 2704. In this example, hardware is implemented using four server cards 2706 and a fifth server card 2708 for a control server. Forwarding plane functions 2710, operating system (OS) 2712, virtualization plane 2714 and services plane 2716 are run on server cards 2706, whereas routing protocol 2718 is ran on control server 2708. In one embodiment, forwarding plane 2710 can be ran on one processor, and the virtual storage management of virtualization plane 2714 can be implemented in local cache engine 2720 of server cards 2706. In alternative embodiments, software can be mapped onto hardware differently. Also, in further alternative embodiments, CLS systems can be implemented using other architectures and technologies.

In an embodiment, software system 2702 implements forwarding plane 2710 having policy engine 2730, flow lookup and classifier 2734, flow action engine 2736, CL flow scheduler 2732, FIB 2742, CL crypto, 2740 and CL REGEX 2738. In one embodiment, OS 2712 is implemented by Linux, however, in alternative embodiments; other operating systems can be used. Virtualization plane 2714 has hypervisor 2750, virtual service flow manager 2754 and virtual storage manager 2752. Services plane 2716 has mash up module 2760, event module 2762, transcoding module 2764, and cache 2766. Management and control plane 2718 has open API 2770, DHT KBR 2772, overlay routing 2774, service policy 2776, user attachment 2778, traffic/request synopsis generator 2780, content routing 2782 and name resolution 2784. Control server 2708 has routing engine processor 2902, integrated memory controller 2906 and I/O ports 2908. Each server card/socket 2706 has service engine (SE) multi-core processor 2910, local cache engine multi-core processor 2720, integrated memory controller 2912, FIB cache 2914, fast path processor (FP) multi-core processor 2920, flow process memory 2916 and I/O ports 2922.

Figure 28:
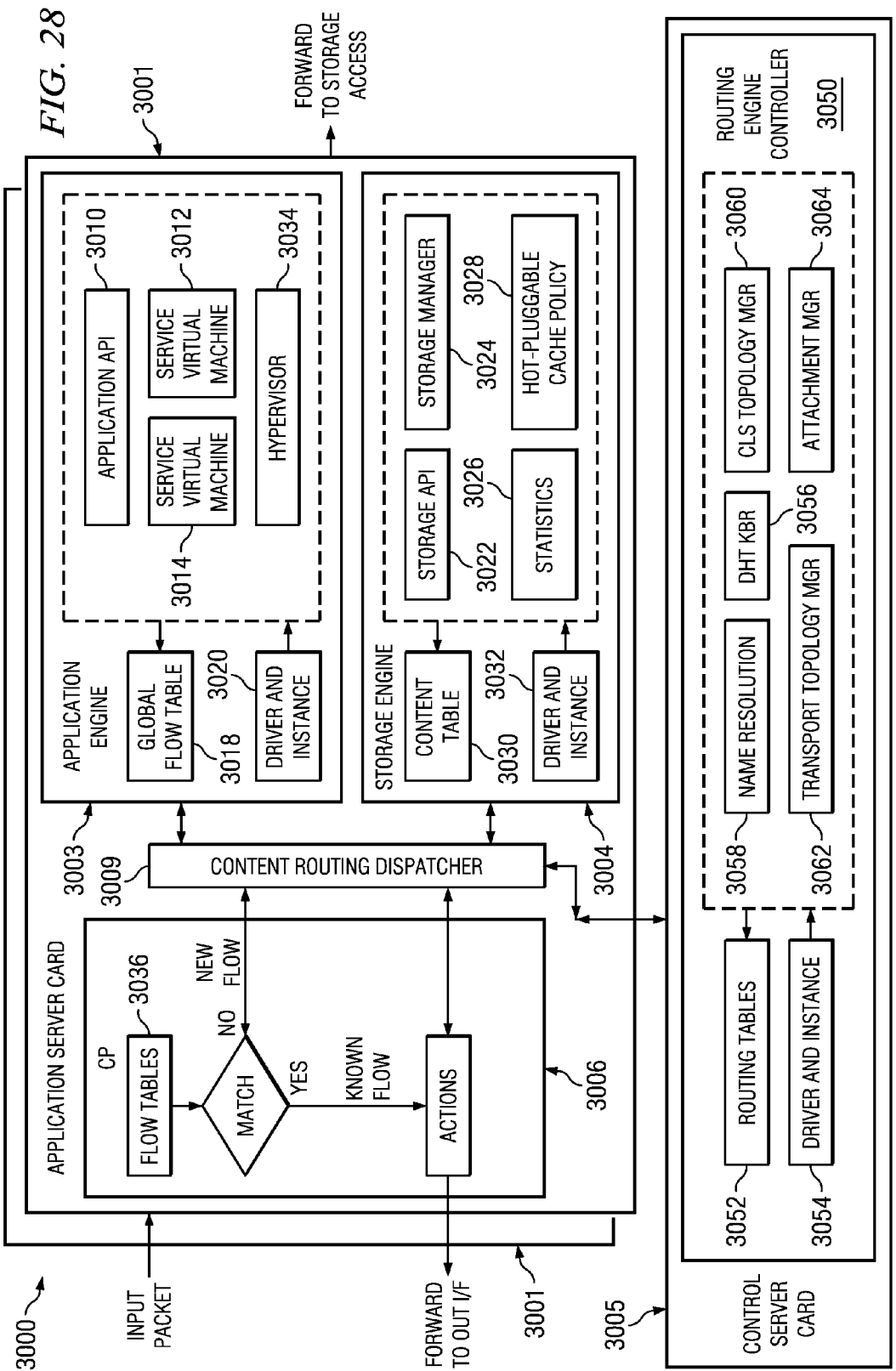
FIG. 28 illustrates a CLS according to an embodiment.

FIG. 28 illustrates a CLS according to an embodiment of the present invention. CLS 3000 has one or more application server cards 3001 and control server card 3005. Application server card 3001 has CP 3006, content routing dispatcher 3009, application engine 3003 and storage engine 3004.

CP 3006 receives an input packet and compares the CL to an entry in flow table 3036. If the entry does not match the flow table, a new flow is initiated, otherwise, an action, such as a mash up procedure to add a short advertisement in video stream, is taken. In some embodiments, CP 3006 performs content flow management, which identifies, creates and removes flow entries from the flow table, and adds, deletes, and/or modifies relevant actions for each flow in the table. Content routing dispatcher 3009 distributes packets to application engine 3003, storage engine 3004 or routing engine controller 3050 to handle data-path packets and control-path packets accordingly.

Application engine 3003 has application API 3010, and one or more service virtual machines 3012, 3014, global flow table 3018, driver & instance 3020 and hypervisor 3034. These functions can be implemented by hardware, or by software running on hardware.

Storage engine 3004 has storage API 3022, storage manager 3024, statistic block 3026, hot pluggable cache policy 3028, content table 3030 and driver and instance 3032. In alternative embodiments of the present invention, CLS 3000 may provide other functions and/or have greater or fewer modules than depicted. In embodiments, storage engine 3004 also includes storage for local cache, which is implemented using hardware such as disk drives, or other types of storage. The total amount of storage devoted to each CLS, depends on usage, the number of clients, and total memory capacity of storage engine 3004. In some embodiments, storage engine 3004 is expandable to keep up with network demands. In an embodiment, storage engine 3004 stores frequently requested content. Content that is not frequently requested, or content that expires because of expired security keys and or TTL labels can be overwritten by new data.

Control server card 3005 has routing engine controller 3050, which includes routing tables 3052, drivers & instance 3054, name resolution 3058, DHT KBR 3056, CLS topology manager 3060, transport topology manager 3062, and attachment manager 3064.

Figure 29:
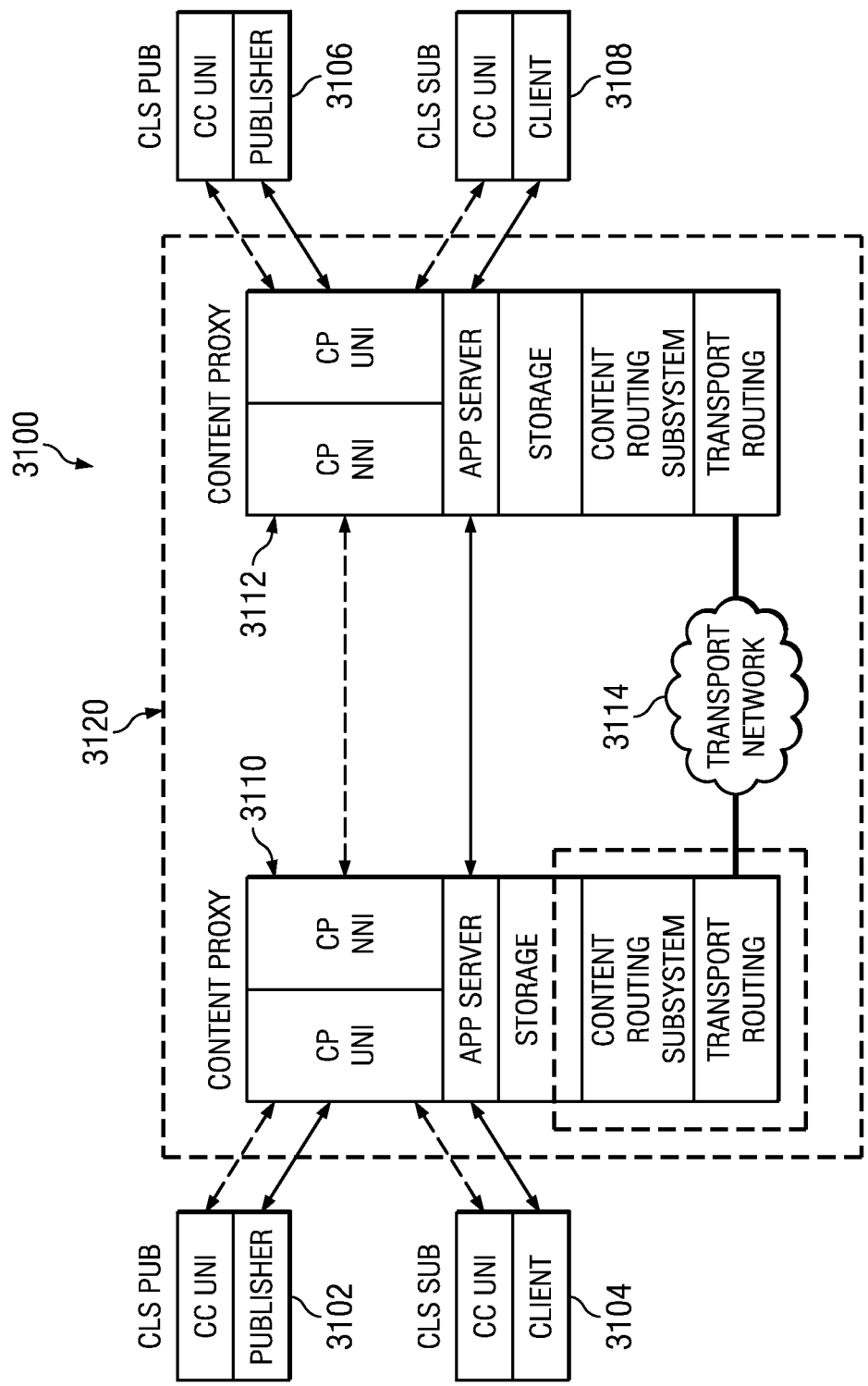
FIG. 29 illustrates an embodiment network system using content proxies.

FIG. 29 illustrates a block diagram of embodiment network system 3100 using an embodiment CLS. CLS publisher 3102 and CLS subscriber 3104 are coupled to first content proxy

3110, and CLS publisher 3106 and CLS subscriber 3108 are coupled to second content proxy 3112 via CP UNI interfaces. Transport routing functions of content proxies 3110 and 3112 are coupled together via content transport network 3114, while the CP NNI interfaces of content proxies 3110 and 3112 communicate with each other.

Embodiments of the present invention formalize the operational semantic of content/application delivery service platform for next generation Internet via a context label. Embodiment CLs inter-relate user personal/device profile, application context and network property all together to form a middleware layer to utilize application intelligence, user profile and network intelligence to guide content/application delivery. In some embodiments, CL/CLL can be implemented to overlay any data transport layer in both infrastructure-oriented and infrastructure-less network, which can deliver content via simple and transparent multi-modal interfaces (e.g., WiFi, Bluetooth, 3G/4G wireless, Ethernet, Optical, etc). Embodiment systems provide efficient and effective network resource optimization by localizing popular content in a local cache server thus creating a "Green" delivery service platform to reduce traffic and non-deterministic data distribution, and in turn, to reduce energy consumption. Some embodiment systems embed security and privacy to support personalized services, and provide intelligent & autonomous network architecture and management (e.g., CL context profile is used for in-banding signaling to support user dynamic mobility). In some embodiments, CLL is a common layer and framework to seamlessly correlate wire-line and wireless for content delivery services.

In an embodiment, a context is a profile having minimal a set of attributes associated with supporting content delivery in a communication network. From the operational semantic of content/application delivery service, a context inter-relates communication-enabled attributes from dynamically changing network properties such as location and presence, a user profile such as interest or preference, a device type, a user ID, and service transaction time; and application attributes such as content name, version, security, size and TTL.

In an embodiment, a CL represents a context assigned for data content. Different from the legacy label defined in MPLS/GMPLS/TMPLS or PBB/PBT, in which a label is used to identify a data transport connection/connectivity. In embodiments, a CL is used to identify a relationship profile for content delivery service. In some embodiments, a CL is an ASCII string attached to application data chucks. According to the defined rules, in one embodiment, CL is identified and processed by a FPGA, an ASIC or a network processor for content switching/routing.

In an embodiment, a protocol stack called Context Label Layer (CLL) creates and inserts a CL for each content chuck (at sender), or modifies a CL (at intermediate relay node), or removes a CL (at receiver) from each content chunk. CLL also implements a CL routing plane, CL forwarding plane, CL service process plane and CL caching process plane. From the perspective of a layered protocol stack, CLL is located between application content/service and data transport protocol. In an embodiment, CLL is responsible to segment/assemble the application content to/from variable size content chunks and dispatch/receive the I-chunks to/from the various lower layer data transport, depending on the MTU capacity of various physical links.

In an embodiment, a context label switch includes computation resources, communication resources, and storage resources. By using computation and communication resources, the context label switch provides content routing and mobility functionality. By using computation and storage resources, the context label switch provides classification, filtering and mash up functionality. By using storage and communication resources, the context label switch provides content search, naming resolution and security functionality. In alternative embodiments, the context label switch provides other resources.

In accordance with an embodiment, a network device has an input port for receiving input packets, and an output port for sending output packets, where the input packets and output packets have context layer information. The network device also includes a processor configured to process the input packets and output packets using a network protocol having a context layer.

In a further embodiment, the network device has a cache, and the processor is further configured to receive an information request from a client via the input port, where the information request includes at least one input packet having a client identification context label and a content identification label. The processor is further configured to determine if content data corresponding to the content identification context label is in the cache. If the content data is in the cache, the content data is sent to the client in at least one first output packet via the output port. The content data is addressed to the client with the client identification label.

In a further embodiment, the network device is further configured to send at least one second output packet to a second network device requesting the content data if the content data is not in the cache. In an embodiment, the at least one second output packet indentifies the content data by the content identification label.

In a further embodiment, the processor is further configured to send at least one third output packet to a third network device requesting the content data if the content data is not available from the second network device, where the at least one third output packet, which carries the content data, is encapsulated and identified by either an IP address, or some other L2 protocols such as an Ethernet MAC address. In an embodiment, the processor is also configured to reformat the content data according to the client identification context label. In some embodiments, the content data comprises video data in a first format, and the processor is further configured to reformat the video data in the first format into a second format. In further embodiments, the network device further includes a switch fabric configured to switch packets between the input port and the output port.

In a further embodiment, the processor of the network device is further configured to transmit a first output packet to a client, where the output packet has a client identification context label identifying the client. If transmission to the client is not successful, or if the client stops asking for more content, the processor will stop the transmission. In an embodiment, a keep-alive protocol can be used to test for the presence of the client. If a client device is no longer reachable, the attachment/presence status of the client is modified.

In a further embodiment, the processor of the network device is further configured to process context layer information comprising user specific information, application specific information, network specific information and security specific information.

In accordance with another embodiment, a method of operating a network device includes transmitting and receiving packets on at least one port and receiving a first packet from a client on at least one port, where the packets have context layer information and the first packet includes a content name and a context label header. The method also includes determining if requested content associated with the content name is in a local cache. If the requested content is not in the local cache, at least one second packet is transmitted to a second network device on the at least one port, where the at least one second packet includes the content name and the context label. If the requested content is in the local cache, at least one third packet is transmitted to the client on the at least one port, where the at least one third packet includes the requested content.

In a further embodiment, the method also includes transmitting at least one fourth packet to a third network device if the second network device does not have the requested content. In a further embodiment, the packets include the content name in HTTP URI and the context label in an extended HTTP entity header that comprises a user device identifier, location information, timing and some other attributes. In some embodiments, the packets are encapsulated in IP protocol if there are IP transport connections among clients and network devices. In some embodiments, the packets are encapsulated in link layer (L2) protocol if there is no IP transport, for example, in Bluetooth, WiFi, Ethernet or other wireless radio links. In further embodiments, transmitting the at least one third packet to the client that comprises the retrieved content and the context label. The third packet is sent back to the client from the ports at which the network devices received the first packet.

In a further embodiment, the method also includes locating a client based on the context label header. The client device may install a GPS locator which can determine the current user location. In a further embodiment, every network device, as well, can install a GPS to determine its own location and they have the GPS knowledge of all the other peering network devices. When the client device sends the first packet, the first packet can include the user's GPS location in the context label. When the second, the third or the fourth network devices send the retrieved content back to the first network device, based on the calculation of client's GPS proximity with the GPS of the network devices, the proximately is used to determine to which first network device the client is currently attached. In some embodiments, the access points are changed while the client device is mobile. For example, the retrieved content is sent to the network device that is the closest one to the user device. The method can also include transmitting at least one second packet to a second network device on the at least one port, and accessing a copy of the requested content from an upstream content provider.

In accordance with another embodiment, a method of operating a context level switch includes receiving a first packet from a client on at least one port, where the packet includes a content name and a context label header. The method also includes retrieving the requested content from the cache and transmitting at least one second packet to the client on the at least one port, where the at least one second packet includes the requested content. In a further embodiment, the context label header includes a client device type context identifier. The method also includes reformatting the requested content according to the client device type context identifier before transmitting the at least one second packet in some embodiment.

In a further embodiment, the context label header includes a time-to-live (TTL) identifier, the TTL identifier denoting a lifetime for the requested content. The method can also include deleting the requested content from the memory at an expiration of the TTL. In some embodiments, the context label header includes a security key for the requested content. In further embodiments, the context label header comprises location information, and the location information comprises global positioning system (GPS) based location information.

In an embodiment, a method of operating a client device includes forming a context label, sending a packet over the network, and receiving a packet. The client device has a processor that runs software implementing content client (CC) functionality. In some embodiments, the client device runs software that implements a network a context label layer (CLL). Alternatively, CLL functionality is implemented by hardware in the client device. The client device is configured to communicate with a network having a context label layer (CLL).

In an embodiment, a method of operating a context layer switch includes receiving packets from clients, and transmitting contents to clients based on a locally stored cache. If the content on the locally stored cache is not available, the context layer switch accesses copies of the content from upstream CLS nodes and/or a content provider. In a further embodiment, a method of operating a context layer switch includes having a context layer (CL) in the Network protocol.

In an embodiment, a method of operating context layer switch includes locating clients based on CL header. In some embodiments, the CL header is used (e.g., GPS information) instead of an IP address. In an embodiment, the context switch interacts with the rest of the network to maintain continuity of service based on the CL header.

In an embodiment, a method of managing cached content includes associating TTL with content, reformatting streaming video data based on client device, and keeping content in cache based on validity of client keys.

In an embodiment, a context layer switch device is configured to receive packets from clients, and transmit content to clients based on locally stored cache. If locally stored cache is not available, the context layer switch obtains copies of the content from upstream CLS nodes and/or a content provider. In a further embodiment, the context layer switch device is configured to locate clients based on a CL header and interacts with the rest of the network to maintain continuity of service. In a further embodiment, the CL header is used instead of an IP address.

In an embodiment, a context layer switch device is configured to associate TTL with content, reformat streaming video data based on a client device, and keep content in cache based on validity of client keys. In a further embodiment, a context layer switch device is configured to run content proxy (CP) software and/or implement CP functionality in hardware.

In an embodiment, a context layer switch device is implemented with interconnected sockets. The context layer switch device has management plane, service plane and routing plane functionality. In a further embodiment, a context layer switch device is configured to operate on a network with a context layer (CL) in the network protocol. In some embodiments, the context layer switch has software that executes a network protocol having a context layer. In some embodiments, network protocol functionality is implemented in hardware.

The advantages of embodiments of the present invention include the ability to help internet service providers (ISPs) to differentiate and prioritize the "high-value" content bits for their billing model, the ability to overlay the content layer over all kinds of data transport layers and flexibly adapt to various link sizes and diverse MTUs, and the ability to efficiently utilize network bandwidth/resource/topology to reduce the cost, improve performance and save energy.

Some embodiments also provide application layer knowledge to better support QoS, scale load balancing, and create a better user experience with personalized services.

Advantages of embodiments further include a networking architecture optimized for content storage and dissemination that addresses issues of scalability, cost efficiency and security for content.

An advantage of embodiments of the present invention that store video content locally and transcode the video according to the screen resolution of the client device is reduced network traffic because multiple versions of the video data do not need to be requested from the service provider.

Advantages of embodiments that employ RouteBricks multi-server/multi-core clusters include fulfillment of content search and process and relay objectives, while at the same time maximizing the system to reduce the delay and to promote throughput.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A network device comprising:
an input port for receiving input packets, the input packets comprising context layer information;
an output port for sending output packets, the output packets comprising context layer information; and
a processor configured to process the input packets and output packets using a network protocol having a context layer, wherein the processor is configured to receive an information request from a client via the input port, the information request comprising at least one input packet comprising a client identification context label and a content identification label; transmit a first output packet to a client, the output packet having a client identification context label identifying the client, wherein if transmission to the client is not successful, or if the client does not ask for more content, or if no acknowledgement is received from the client, the processor stops sending out packets to the client.

2. A network device comprising:
an input port for receiving input packets, the input packets comprising context layer information;
an output port for sending output packets, the output packets comprising context layer information; and
a processor configured to process the input packets and output packets using a network protocol having a context layer, wherein the processor is configured to receive an information request from a client via the input port, the information request comprising at least one input packet comprising a client identification context label and a content identification label;
wherein the network device comprises a cache, and the processor is further configured to:
determine if content data corresponding to the content identification context label is in the cache; and
if the content data is in the cache, sending the content data to the client in at least one first output packet via the output port, wherein the content data is addressed to the client with the client identification label.

3. The network device of claim 2, wherein the processor is further configured to send at least one second output packet to a second network device requesting the content data if the content data is not in the cache, the at least one second output packet identifying the content data by the content identification label.

4. The network device of claim 3, wherein the processor is further configured to modify the content identification label of the at least one second packet before sending the at least one second output packet.

5. The network device of claim 3, wherein the processor is further configured to send at least one third output packet to a third network device requesting the content data if the content data is not available from the second network device, the at least one third output packet identifying a destination of the content data by an internet protocol (IP) address, or some other link layer address.

6. The network device of claim 2, wherein the processor is further configured to reformat the content data according to the client identification context label.

7. The network device of claim 6, wherein the content data comprises video data in a first format, and the processor is further configured to reformat the video data in the first format into a second format.

8. The network device of claim 6, wherein:
the content data comprises Web page data in a first format; and
the processor is further configured to reformat the Web page data by adding other data from the first format into a second format.

9. The network device of claim 8, wherein the other data comprises an advertisement.

10. The network device of claim 1, further comprising a switch fabric configured to switch packets between the input port and the output port.

11. The network device of claim 1, wherein the processor is configured to process context layer information, where the context layer information comprises user specific information, application specific information, network specific information and security specific information.

12. A method of operating a network device, the method comprising:
transmitting and receiving packets on at least one port, the packets comprising context layer information;
receiving a first packet from a client on at least one port, the first packet comprising a content name and a context label header;
determining if requested content associated with the content name is in a local memory;
if the requested content is not in the local memory, transmitting at least one second packet to a second network device on the at least one port, the at least one second packet comprising the content name; and
if the requested content is in the local memory, transmitting at least one third packet to the client on the at least one port, the at least one third packet comprising the requested content.

13. The method of claim 12, wherein the at least one second packet is encapsulated in an internet protocol (IP) address or L2 protocol address.

14. The method of claim 12, wherein the content name comprises an HTTP URI and the context label header comprises a user device identifier, GPS location, TTL, or a key locator.

15. The method of claim 12, wherein transmitting the at least one third packet to the client comprises the network device sending retrieved content and a context label header to an output port paired with the at least one port, wherein the at least one port comprises an input port.

16. The method of claim 12, further comprising locating a client based on the context label header, locating the client comprising determining proximity between client GPS data in the context label and a predetermined network device GPS location.

17. The method of claim 12, wherein transmitting at least one second packet to a second network device on the at least one port comprises accessing a copy of the requested content from an upstream content provider.

18. A method of operating a context level switch, the method comprising:
   receiving a first packet from a client on at least one port, the packet comprising a content name and a context label header;
   retrieving requested content from memory; and
   transmitting at least one second packet to the client on the at least one port, the at least one second packet comprising the requested content.

19. The method of claim 18, wherein the context label header comprises a client device type context identifier.

20. The method of claim 19, further comprising reformatting the requested content according to the client device type context identifier before transmitting the at least one second packet.

21. The method of claim 18, wherein the context label header comprises a time-to-live (TTL) identifier, the TTL identifier denoting a lifetime for the requested content.

22. The method of claim 21, further comprising deleting the requested content from the memory at an expiration of the TTL.

23. The method of claim 18, wherein the context label header comprises a security key for the requested content.

24. The method of claim 18, wherein the context label header comprises location information.

25. The method of claim 24, wherein the location information comprises global positioning system (GPS) based location information.

* * * * *